United States Patent
Fatehi et al.

(10) Patent No.: US 11,220,446 B2
(45) Date of Patent: Jan. 11, 2022

(54) PROCESS FOR PRODUCING AN ANIONIC LIGNIN COPOLYMER UNDER AQUEOUS ACID CONDITIONS

(71) Applicants: FPInnovations, Pointe-Claire (CA); LAKEHEAD UNIVERSITY, Thunder Bay (CA)

(72) Inventors: Pedram Fatehi, Thunder Bay (CA); Fangong Kong, Jinan (CN); Shoujuan Wang, Jinan (CN); Jacquelyn Price, Port Burwell (CA); Michael Paleologou, Beaconsfield (CA)

(73) Assignee: FPInnovations, Pointe-Claire (CA)

( * ) Notice: Subject to any disclaimer, the term of this patent is extended or adjusted under 35 U.S.C. 154(b) by 0 days.

(21) Appl. No.: 16/492,202

(22) PCT Filed: Mar. 7, 2018

(86) PCT No.: PCT/CA2018/050270
§ 371 (c)(1),
(2) Date: Sep. 9, 2019

(87) PCT Pub. No.: WO2018/161165
PCT Pub. Date: Sep. 13, 2018

(65) Prior Publication Data
US 2020/0040143 A1 Feb. 6, 2020

Related U.S. Application Data

(60) Provisional application No. 62/468,982, filed on Mar. 9, 2017.

(51) Int. Cl.
| | | |
|---|---|---|
| C02F 1/56 | (2006.01) | |
| C02F 11/147 | (2019.01) | |

(Continued)

(52) U.S. Cl.
CPC .............. *C02F 1/56* (2013.01); *C02F 11/147* (2019.01); *C08F 289/00* (2013.01); *C08H 6/00* (2013.01);
(Continued)

(58) Field of Classification Search
CPC ......... C08H 6/00; C02F 11/147; C08F 289/00
See application file for complete search history.

(56) References Cited

U.S. PATENT DOCUMENTS

| | | | |
|---|---|---|---|
| 2,464,828 A | 2/1944 | Pollak et al. | |
| 3,985,659 A * | 10/1976 | Felicetta | C09K 8/24 507/108 |

(Continued)

FOREIGN PATENT DOCUMENTS

| | | |
|---|---|---|
| CA | 2330117 | 6/1999 |
| CN | 104649790 | 5/2015 |

(Continued)

OTHER PUBLICATIONS

Ye et al. (International Journal of Biological Macromolecules 63 (2014) 43-48) (Year: 2014).*

(Continued)

*Primary Examiner* — Liam J Heincer
(74) *Attorney, Agent, or Firm* — Norton Rose Fulbright LLP

(57) ABSTRACT

An acidic water-based process was developed for the synthesis of anionic lignin copolymers with adjustable MW, thermal stability and solubility in water. The anionic lignin copolymer described herein comprises: a molecular weight of 5,000 to $7.4 \times 10^5$ g/mol; and a charge density of $-1$ to $-7.2$ meq/g. The anionic lignin copolymers described herein which have a molecular weight range of 000-50,000 g/mol can be used as dispersants of negatively charged molecules or particles in numerous process or wastewater streams (e.g.

(Continued)

concrete admixtures, gypsum slurries, textile dye) while such copolymers in a molecular weight range of 90,000-740,000 g/mole can be used as flocculants of positively charged molecules or particles in numerous process and wastewater streams including industrial and municipal systems and sludge dewatering in the textile dye, pulp & paper, mining and oil industries.

17 Claims, 15 Drawing Sheets

(51) Int. Cl.
| | |
|---|---|
| *C08F 289/00* | (2006.01) |
| *C08H 7/00* | (2011.01) |
| *C02F 103/10* | (2006.01) |
| *C02F 103/28* | (2006.01) |
| *C02F 103/30* | (2006.01) |
| *C02F 103/36* | (2006.01) |

(52) U.S. Cl.
CPC ...... *C02F 2103/10* (2013.01); *C02F 2103/28* (2013.01); *C02F 2103/30* (2013.01); *C02F 2103/365* (2013.01)

(56) References Cited

U.S. PATENT DOCUMENTS

| | | | | |
|---|---|---|---|---|
| 4,276,077 | A * | 6/1981 | Zaslavsky | C08F 289/00 71/64.01 |
| 4,303,438 | A * | 12/1981 | Zaslavsky | C09K 17/22 71/27 |
| 4,374,738 | A * | 2/1983 | Kelley | C09K 8/24 507/108 |
| 4,387,205 | A * | 6/1983 | Zaslavsky | C08F 289/00 527/400 |
| 4,676,317 | A * | 6/1987 | Fry | C04B 24/18 166/293 |
| 4,871,825 | A * | 10/1989 | Lin | C08F 289/00 527/400 |
| 4,891,415 | A * | 1/1990 | Lin | C02F 1/5263 527/400 |
| 5,138,007 | A * | 8/1992 | Meister | C08F 289/00 527/400 |
| 5,251,698 | A * | 10/1993 | Kalfoglou | C09K 8/88 166/270.2 |
| 6,593,460 | B1 * | 7/2003 | Huttermann | C08H 6/00 530/505 |
| 6,942,031 | B1 * | 9/2005 | Kalfoglou | C09K 8/594 166/271 |
| 8,486,224 | B2 | 7/2013 | Tomani et al. | |
| 8,771,464 | B2 | 7/2014 | Kouisni et al. | |
| 2007/0260046 | A1 * | 11/2007 | Tomita | C08F 283/06 530/500 |
| 2012/0122738 | A1 * | 5/2012 | Bin Mohamad Ibrahim | C09K 8/035 507/106 |

FOREIGN PATENT DOCUMENTS

| | | |
|---|---|---|
| EP | 0442508 | 8/1991 |
| GB | 847602 | 9/1960 |

OTHER PUBLICATIONS

Kong et al. (Green Chem., 2015, 17, 4355-4366) (Year: 2015).*
Kouisni et al. Journal of Science & Technology for Forest Products and Processes, 2012, 2(4), 6-10.
Kouisni et al. 6th NWBC Conference Proceedings, Helsinki, Finland, Oct. 20-22, 2015, p. 193-199.
Yan et al., Colloid, Surface. A., 2010, 371, 50.
Lappan et al. Ind. Eng. Chem. Res., 1997, 36, 1171.
Catalgil-Giz et al., J. Appl. Polym. Sci., 2004, 91, 1352.
Phillips et al. J. Appl. Poly. Sci. 1971, 15, 2929.
Zhang et al. M.G. Bioenerg Res 2011, 4, 246.
Stewart, D.; Ind. Cro. Prod. 2008, 27, 202.
Ye et al., Int. J. Biol. Macromol. 2014, 63, 43.
Fatehi, P. Curr. Org. Chem. 2013, 17, 1569.
Amen-Chen et al. Bioresour. Technol. 2001, 79, 227.
Wei et al. Oil Field Chemistry, 2002, 19, 15.
Chen et al. Macromolecules, 196, 29, 1389.
Ye et al. Carbohydr. Polym., 2012, 89, 876.
Chen et al. ACS Symp. Ser., 1982, 187, 285.
Chen et al., J. Appl. Polym. Sci., 1980, 25, 2211.
Porto et al. Arq. Bras. Med. Vet. Zootec, 2006, 58, 99.
Mai et al., Enzyme Microb. Technol., 2000, 27, 167.
Meister et al., K. Appl. Polym. Sci., 1984, 29, 3457.
Meister et al., Sbstracts of Papers of the American Chemical Society, 1984, 187, 111.
Ibrahim et al., Bioresources, 2014, 9, 1472.
Fang et al. Nat. Sci., 2009, 1, 17.
Chen et al., J. Appl. Polum. Sci., 1979, 24, 1609.
Kong et al., Green Chem., 2015, DOI: 10.1039/C5GC00228A.
Andes, M. V., La chimica E I' Industria, 2006, 88, 88.
Sadeghifar et al., Ind. Eng. Chem. Res., 2012, 51, 16713.
Schuerch, C. J., Am. Chem. Soc. 1952, 74, 5061.
Witono, et al. Carbohydr. Res., 2013, 370, 38.
Zhou et al., CIESC J., 2012, 63, 258.
Jahan et al. Bioresour. Technol., 2007, 98, 465.
Ovenden et al., Colloid. Surface A., 2002, 197, 225.
Xiao et al., Colloid interface Sci., 1999, 216, 409.
Blanksby et al., Acc. Chem. Res., 2003, 36, 255.
Lanzalunga et al., J. Photochem. Photobiol. B: Biol., 2000, 56, 85.
Ludwig et al. Lignins: occurence, formation, structure and reactions; Wiley-Interscience, 1971.
Kislenko et al., Eur. Polym., J., 1996, 32, 1023.
Agnemo et al., Acta Chem. Scand. B., 1979, 33, 337.
Ye et al., Int. J. Biol. Macromol., 2013, 60, 77.
Sarkar et al., Carbohydr. Polym. 2013, 95, 753.
Nayak et al., Poly. Int. 2001, 50, 875.
Chen, et al., J. Appl. Polym. Sci. 1986, 32, 4815.
Khalil et al. Angew. Makromol. Chem., 1993, 213, 43.
Witono et al., Carbohydr. Polym., 2012, 90, 1522.
Bayazeed et al. Starch-Starke, 1989, 41, 233.
Petridis et al., J. Am. Chem. Soc., 2011, 133, 20277.
Huttermann et al., Naturwissenchaften, 2000, 87, 539.
Kiatkamjornwong et al., Phys. Chem., 2000, 59, 413.
Fu et al., J. Applé. Polym. Sci. 2002, 85, 896.
Thakur et al., J. Polym. Environ., 2012, 20, 164.
Ayed et al., Chem. Eng. J., 2010, 165, 200.
Ibrahim et al., Carbohydr. Polym., 2010, 80, 1102.
Pandey et al., J. Appl. Polym. Sci., 1999, 71, 1969.
Casas et al., Chem. Technol. Biotechnol., 2012, 87, 472.
El Mansouri et al., J. Ind. Cro. Prod., 2006, 24, 8.
Wang et al., Adances Materials Research, 2010, 96, 227.
Mccluskey et al., J. Solid State Chem. 1989, 83, 332.
Wang et al., Advance In Ecological Environment functional Materials and Ion Inductry 2010, 96, 227.
Lundquist et al., Acta Chem. Scand. B., 1981, 35, 497.
Nagy et al., Green Chem., 2010, 12, 31.
Hu et al., J. Wood Chem. Tehcnol., 2014, 34, 122.
Kang et al., Ind. Cro. Prod. 2014, 56, 105.
Xiong et al., Macromolecules, 2003, 36, 9979.
Nikouei et al., Acta Biomater., 2011, 7, 3708.
Besra et al., Sep. Purif. Technol., 2004, 37, 231.
Zhou et al., Langmuir, 2006, 22, 6775.
Tamburic et al., Controlled Release, 1995, 37, 59.
Barzegari et al., Polym. Compos., 2012, 33, 353.
Feng et al., Sep. Pruif. Technol., 2004, 40, 61.
Healy et al., J. Colloid Sci., 1964, 19, 323.
Ghosh et al., Bioresour. Technol., 2010, 101, 9638.
Chetali Gupta et al. "Polymer-Grafted Lignin Surfactants Prepared via Reversible Addition-Fragmentation Chain-Transfer Polymerization", Langmuir, vol. 30, No. 31, 2014, pp. 9303-9312.

(56) References Cited

OTHER PUBLICATIONS

Nur Amalina Azhar et al. "Grafting Efficiency of Lignin-Grafted-Polyacrylic Acid", Applied Mechanics and Materials, vol. 735, 2015, pp. 182-185.

* cited by examiner

PROCESS FOR PRODUCING AN ANIONIC LIGNIN COPOLYMER UNDER AQUEOUS ACID CONDITIONS

CROSS-REFERENCE TO RELATED APPLICATIONS

The present application is a U.S. National Phase of International Application No. PCT/CA2018/050270, filed on Mar. 7, 2018, and claiming priority from U.S. Provisional Application No. 62/468,982 filed Mar. 9, 2017, the content of which is hereby incorporated by reference in its entirety.

FIELD

The present relates to copolymerization of kraft lignin to produce a water soluble anionic copolymer, that is useful as a flocculant for wastewater treatment and/or other applications.

BACKGROUND

Lignin is a natural bio macromolecule and one of the main components of plant cell walls. Over 60 million tons of lignin is produced globally in the pulp and paper industry annually.[1] Among the technical lignins produced, kraft lignin (KL) is the most dominant but is mainly incinerated as a low cost fuel in the pulping industry, leading to a waste of resources and growing environmental problems.[2] With the depletion of fossil fuels and the enhancement of environmental awareness, greater efforts have been made on developing lignin-based materials. However, kraft lignin has yet to be effectively utilized.[3,4]

Several processes exist for the recovery of lignin from black liquor. These include: the Westvaco process developed over 60 years ago (Pollak et al., U.S. Pat. No. 2,464,828, 1949), the LignoBoost™ process, developed by STFI (now called Innventia) and licensed to Valmet (Tomani et al., U.S. Pat. No. 8,486,224, Jul. 13, 2013) and the LignoForce System™ jointly developed by FPInnovations and NORAM (Kouisni and Paleologou, U.S. Pat. No. 8,771,464, Jul. 8, 2014). In these processes, black liquor acidification is predominantly performed by using either carbon dioxide or a mineral acid (e.g. sulphuric acid) or a combination of the two to drop the pH of the black liquor from about 13-14 to about 10 (pKa of phenolic hydroxyl groups), at which pH, lignin comes out of solution in the colloidal form. The lignin colloidal suspension is then kept in a tank for the lignin colloidal particles to coagulate to a size that is easy to filter and wash. After acidification and coagulation, the lignin is then filtered to produce an unwashed lignin cake of high residual black liquor content (hereby referred to as high residual content (HRC) lignin). During the filtration of the acidified black liquor slurry, most of the inorganic compounds, low molecular weight lignin, degraded sugars, and sugar acids end up in the filtrate which is sent back to the recovery cycle—the lignin content in the HRC lignin cake is typically about 80% of the total solids. In most commercially available processes for lignin production, the HRC lignin is, subsequently, washed with acid (e.g. sulphuric acid) and water to produce a purified washed lignin product (hereby referred to as low residual content (LRC) lignin)—the lignin content in the LRC lignin cake is typically 95-98% of the total solids. A unique feature of the LignoForce™ process is that, prior to the addition of $CO_2$, the black liquor is oxidized under controlled conditions, with respect to oxygen charge, temperature and time (Kouisni and Paleologou, U.S. Pat. No. 8,771,464, 2014; Kouisni et al., Journal of Science & Technology for Forest Products and Processes, 2012, 2 (4), 6-10). Under these conditions, the chemical requirements are reduced, lignin filterability is improved and pure lignin at high solids is obtained. Another advantage of the LignoForce System™ is that the emission of malodorous sulphur compounds from both process and product are significantly reduced (Kouisni et al., 6th NWBC Conference Proceedings, Helsinki, Finland, Oct. 20-22, 2015, p. 193-199). Hence, by using the LignoForce™ system for lignin production, it is possible to use not only acid-washed lignin but also unwashed lignin in various lignin applications.

Lignin is a highly stable and complex compound with a three-dimensional aromatic polymeric structure formed from three phenylpropanoid monomer units, guaiacyl, syringyl and p-hydroxyphenyl, which are connected by ether and carbon-carbon bonds in an irregular fashion.[5] Various modification techniques were carried out in the past to produce new lignin-based products with beneficial properties. One of these modifications is the copolymerization of lignin with functional monomers, which can increase both the molecular weight and number of functional groups on lignin structure. Wei et al.[6] copolymerized lignosulfonate with acrylamide and acetic acid, and used the product as a drilling mud thinner and viscosity reducer. Chen et al.[7] synthesized a copolymer by reacting lignosulfonate with 1-ethenylbenzene to enhance thermal stability and molecular weight of the copolymer. The copolymerization of lignosulfonate with vinyl monomers, i.e. acrylic acid, acrylonitrile and methyl methacrylate, have also been studied in aqueous or organic media in the past via chemical radical initiators[8-11] or chemo-enzymatic starters[12] producing products with high hydrophilic or hydrophobic properties and high molecular weights. Meister et al.[13,14] synthesized a lignin copolymer with acrylamide and kraft lignin in a dioxane solution and used it as a drilling mud additive. In another report, 1-phenylethylene-kraft lignin copolymer was produced in a dimethyl sulfoxide solution and was used as an oil recovery agent. However, organic solvents, such as dioxane and dimethyl sulfoxide, which are generally used for facilitating the homogeneous copolymerization of kraft lignin and other monomers are usually toxic, expensive and cannot be easily handled in commercial processes; thus the developed processes are not be industrially attractive.

In the past, the copolymerization of lignin in aqueous solutions was assessed. Ibrahim et al.[15] copolymerized soda lignin with 2-acrylamideo-2-methylpropane in 1 wt. % NaOH solution, and the product, a soda lignin copolymer with a molecular weight of $2.6 \times 10^6$ g/mol, was used as a drilling mud additive. Fang et al.[16] also produced a cornstalk lignin-acrylamide copolymer in NaOH solution which was used as an adsorbent for dye removal from wastewater. However, there is no investigation in the prior art relating to the copolymerization of kraft lignin and acrylic acid in aqueous acidic solutions.

The copolymerization of lignin with vinyl monomers was studied in the past.[10,12,17-19] It was stated that the complex and heterogeneous structure of lignin played an important role in the copolymerization. However, there exist contradictory reports in the prior art on the role of phenolic groups in the copolymerization of lignin with vinyl monomers: some groups claim that the phenolic group acts as an inhibitor owing to the quinonoid structure produced in copolymerization (e.g. as observed in the copolymerization of styrene with lignosulfonate[19] or with hydrochloric softwood lignin;[17]) while other groups claim that the phenolic group acts as an active centre for the copolymerization. It was observed by others that the conversion rate of acrylic monomers, i.e. Acrylic Acid (AA), acrylonitrile and methyl methacrylate, was significantly accelerated in the presence of lignosulfonate.[3,10] It was also theorized that in the copolymerization reaction, the aliphatic hydroxyl groups of KL might react with the carboxylate groups of polyacrylic acid (PAA) formed during the lignin-AA copolymerization reaction through esterification, which would also graft PAA onto lignin.[20]

SUMMARY

In one aspect described herein there is a process for producing an anionic lignin copolymer under aqueous acidic solutions.

There is a need to understand the role of phenolic groups on the copolymerisation of kraft lignin and anionic monomers. An understanding of the esterification reaction under acidic heterogeneous conditions is a further aspect described herein.

In accordance with another aspect, there is provided a method for preparing an anionic lignin copolymer comprising: providing water; providing a lignin; providing at least one anionic monomer; mixing the water, the lignin, and the at least one monomer compound under acidic free radical generating conditions to polymerize the lignin and at least one monomer compound in aqueous suspension and to produce the anionic lignin copolymer.

In accordance with another aspect, there is provided the method described herein, wherein the anionic monomer is a vinyl monomer.

In accordance with another aspect, there is provided the method described herein, wherein the vinyl monomer is selected from the group consisting of acrylic acid, acrylonitrile and methyl methacrylate and combinations thereof.

In accordance with another aspect, there is provided the method described herein, wherein the anionic monomer is acrylic acid.

In accordance with another aspect, there is provided the method described herein, wherein the acidic free radical generating conditions are in aqueous solution with an acid and at least one of a free radical initiator, a UV light, and microwaves.

In accordance with another aspect, there is provided the method described herein, wherein the free radical initiator is sodium persulphate or potassium persulphate.

In accordance with another aspect, there is provided the method described herein, wherein the pH of the acidic free radical generation conditions is from 2 to 7.

In accordance with another aspect, there is provided the method described herein, wherein the pH is 3 to 4.

In accordance with another aspect, there is provided the method described herein, wherein the lignin is an acid washed low residual content (LRC) lignin or an unwashed high residual content (HRC) lignin.

In accordance with another aspect, there is provided the method described herein, wherein the lignin is the unwashed high residual content (HRC) lignin.

In accordance with another aspect, there is provided an anionic lignin copolymer comprising: a molecular weight of 5,000 to $7.4 \times 10^5$ g/mol; a carboxylate group content of 2 to 7 mmole/g and a charge density of −1.0 to −7.2 meq/g.

In accordance with another aspect, there is provided the anionic lignin copolymer described herein, wherein the molecular weight is 5,000 to 50,000 g/mol.

In accordance with another aspect, there is provided the anionic lignin copolymer described herein, wherein the molecular weight is 90,000 to 740,000 g/mol.

In accordance with another aspect, there is provided the anionic lignin copolymer described herein, wherein the anionic compound is acrylic acid.

In accordance with another aspect, there is provided a method of flocculating positively charged particles or molecules in a wastewater by adding the anionic lignin copolymer defined herein.

In accordance with another aspect, there is provided the method described herein, wherein the wastewater is industrial wastewater and/or municipal wastewater.

In accordance with another aspect, there is provided the method described herein, wherein the industrial wastewater is from textile dye, pulp and paper, mining or oil industries.

In accordance with another aspect, there is provided the method described herein, wherein the anionic lignin copolymer dewaters sludge from the industrial wastewater.

In accordance with another aspect, there is provided a method of dispersing negatively charged particles or molecules in a wastewater or process stream by adding the anionic lignin copolymer defined herein.

Figure 11:
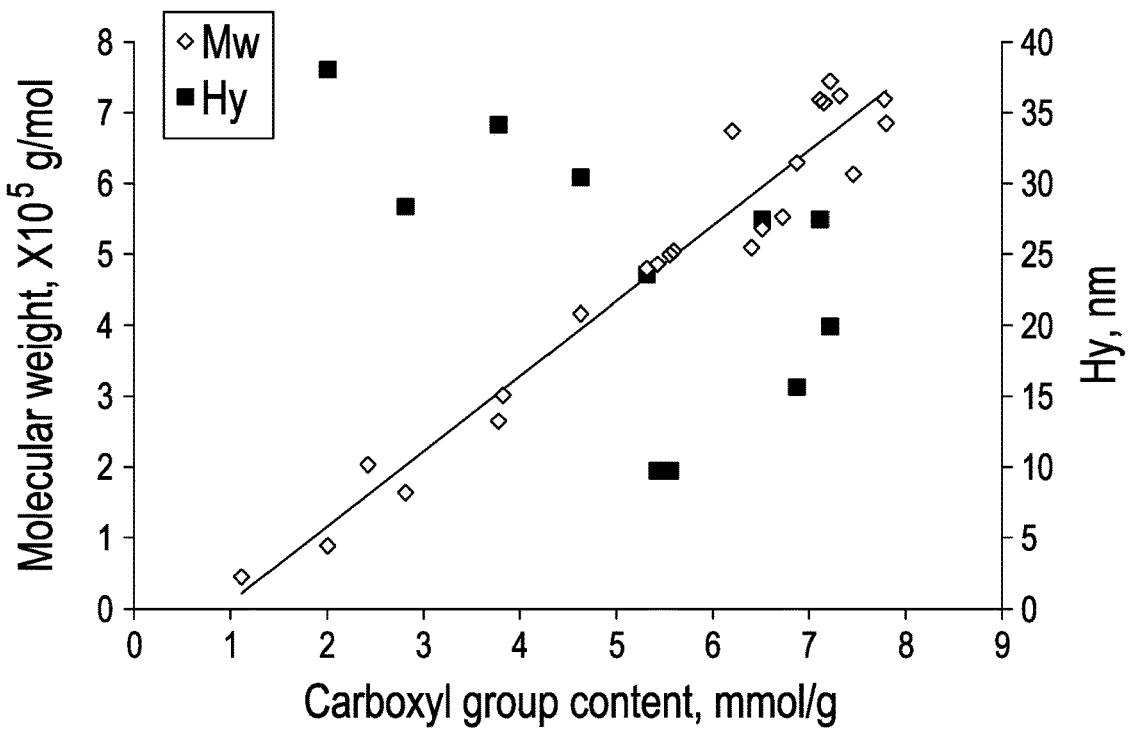
Figure 12:
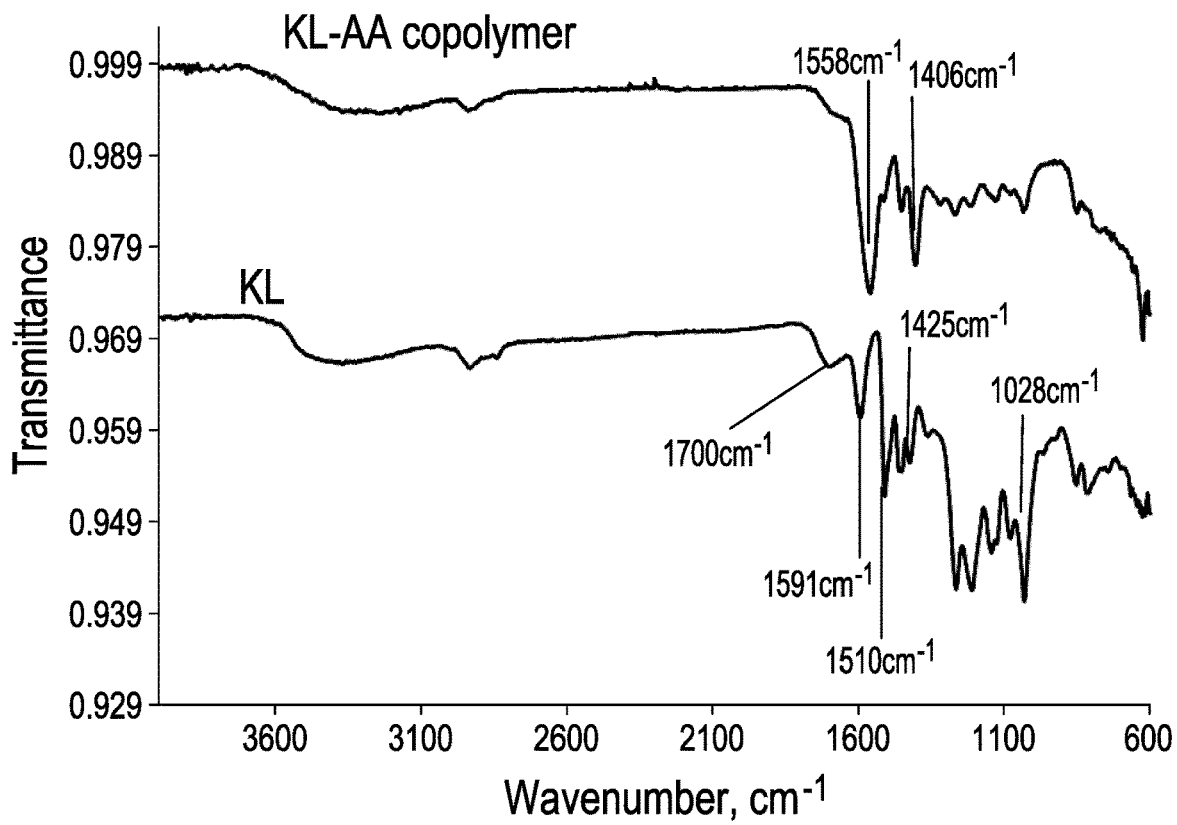
Figure 13:
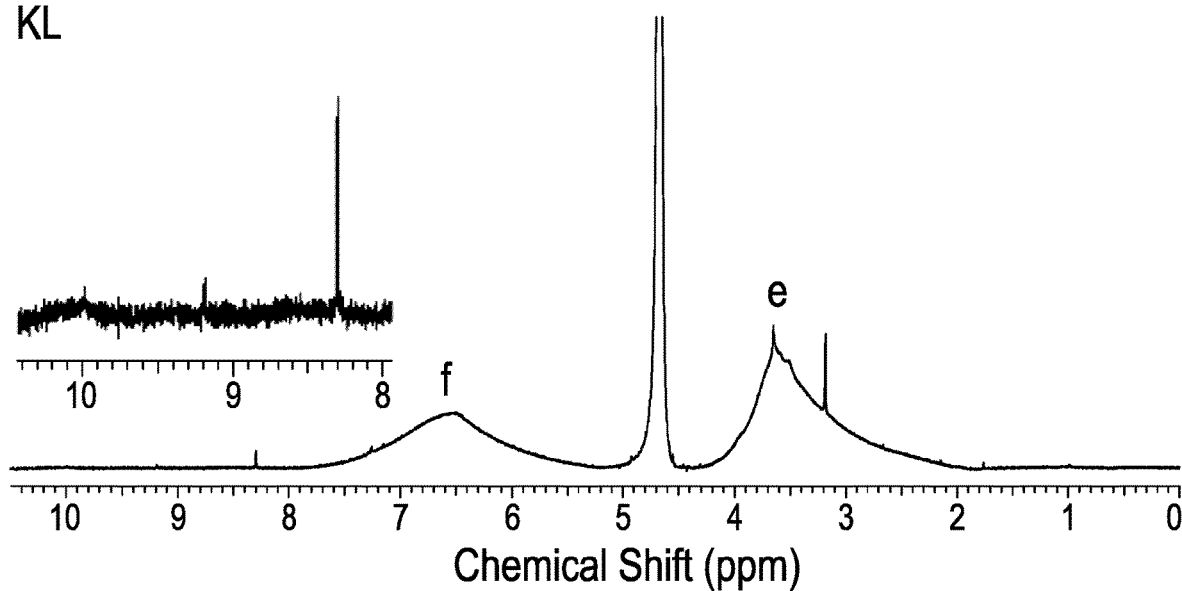
Figure 13:
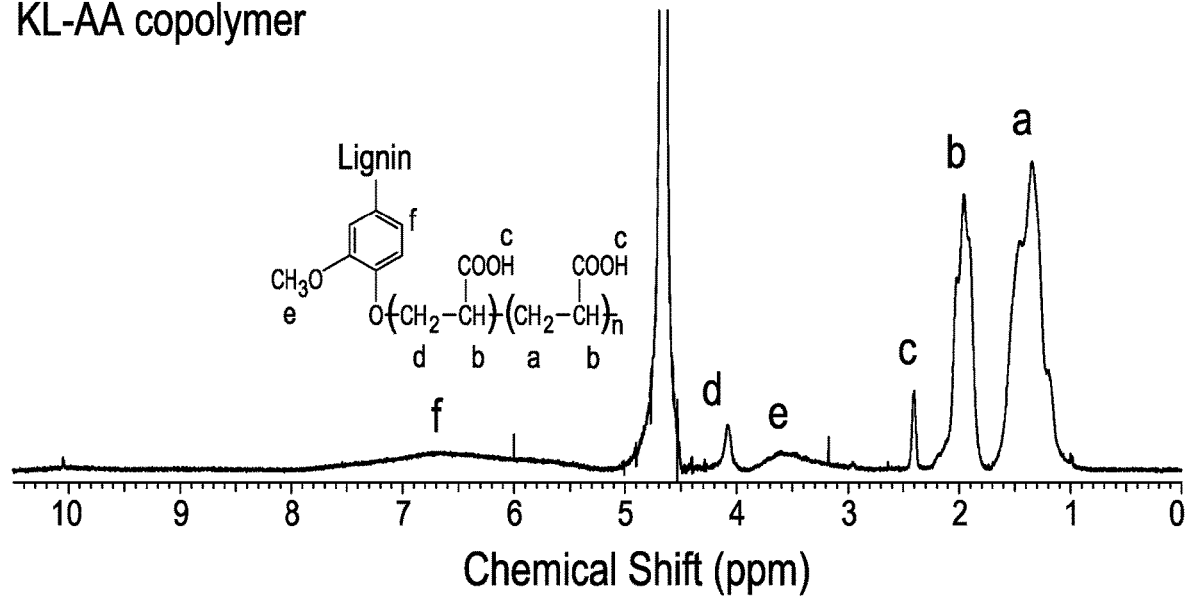
Figure 14:
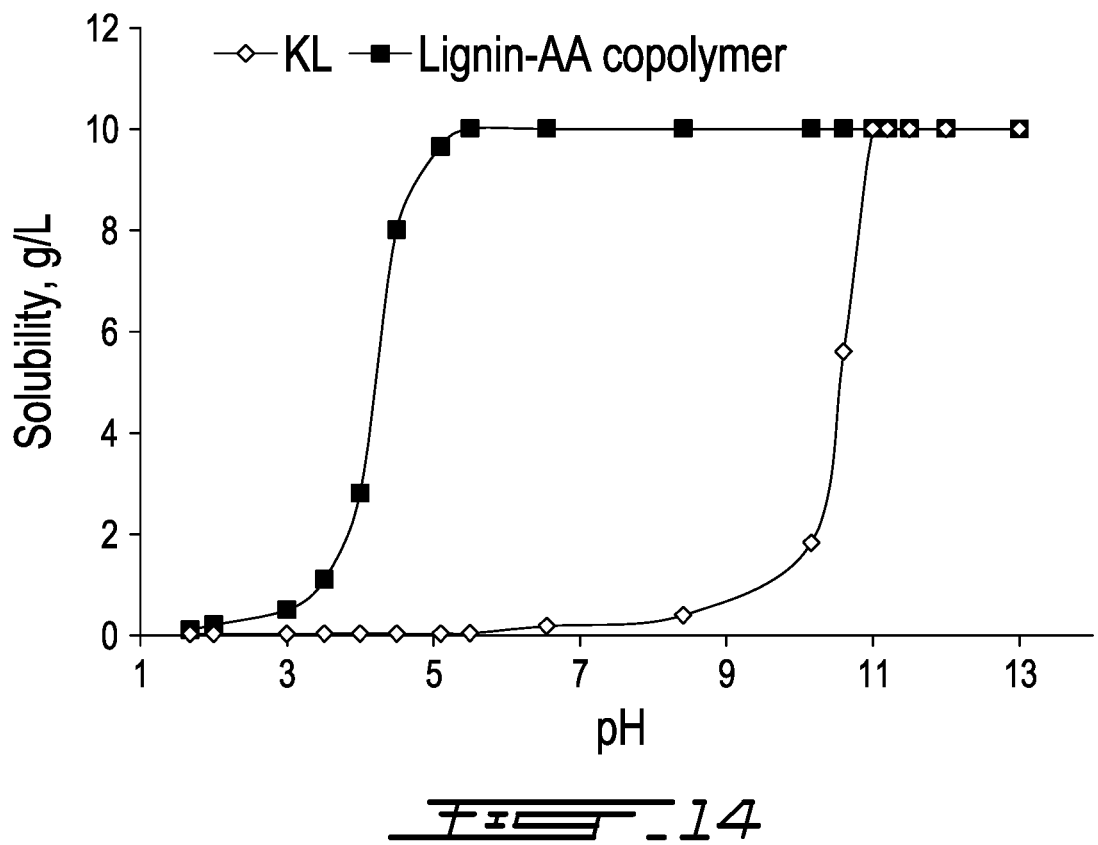
Figure 15:
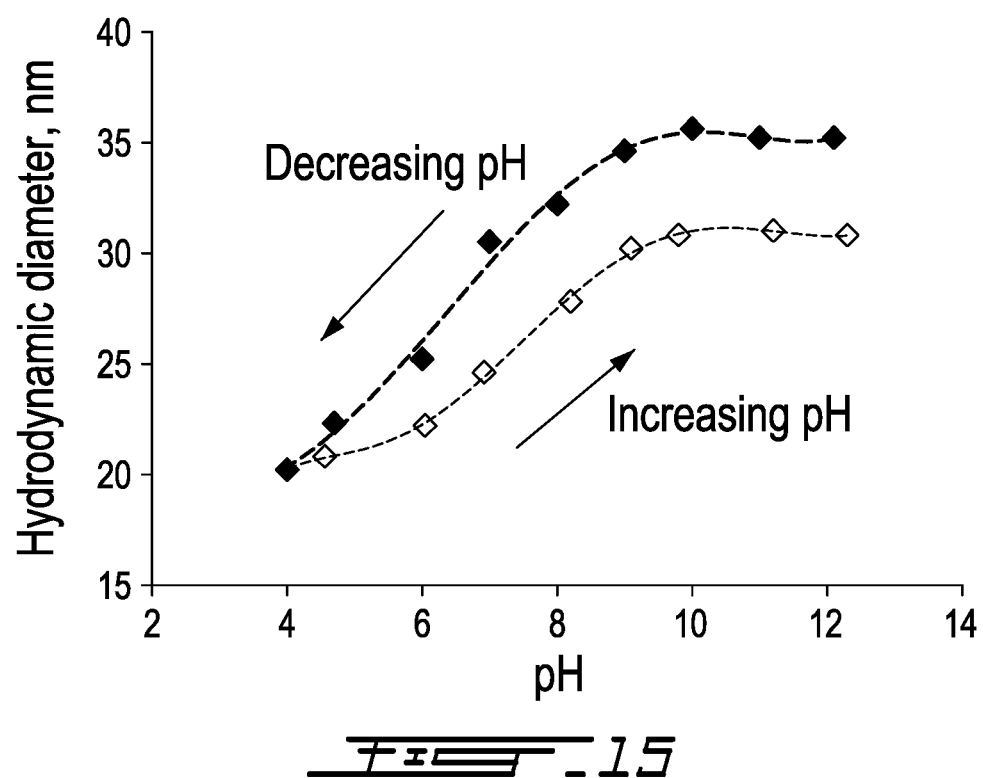
Figure 16:
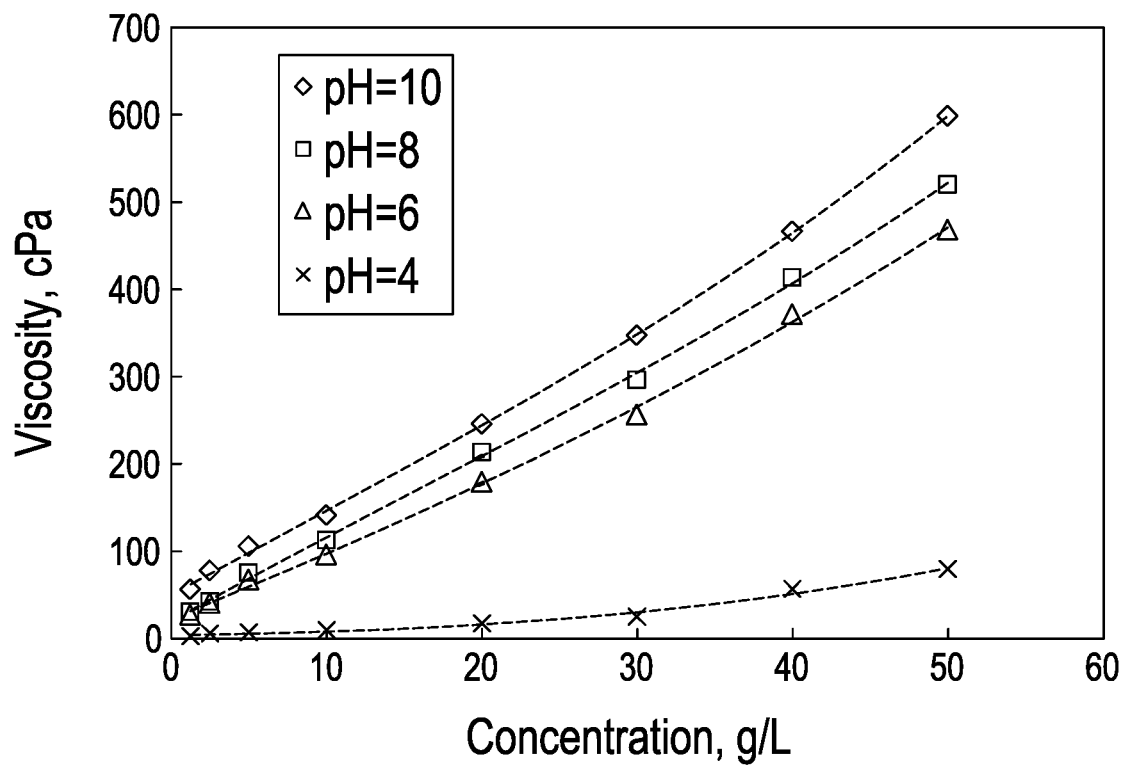
Figure 17:
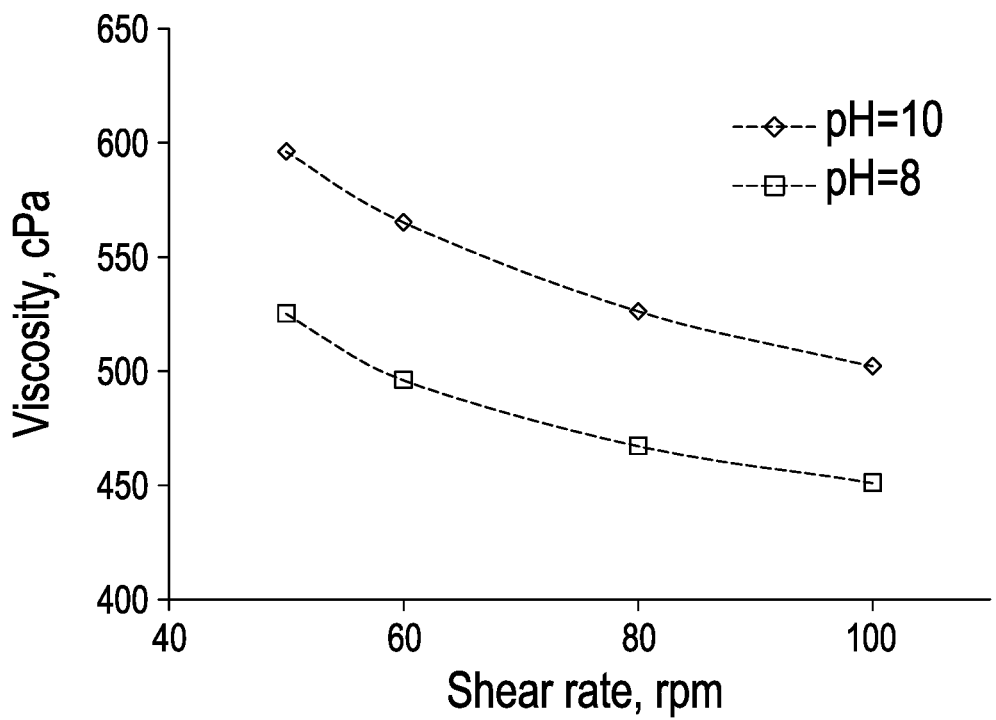
Figure 18A:
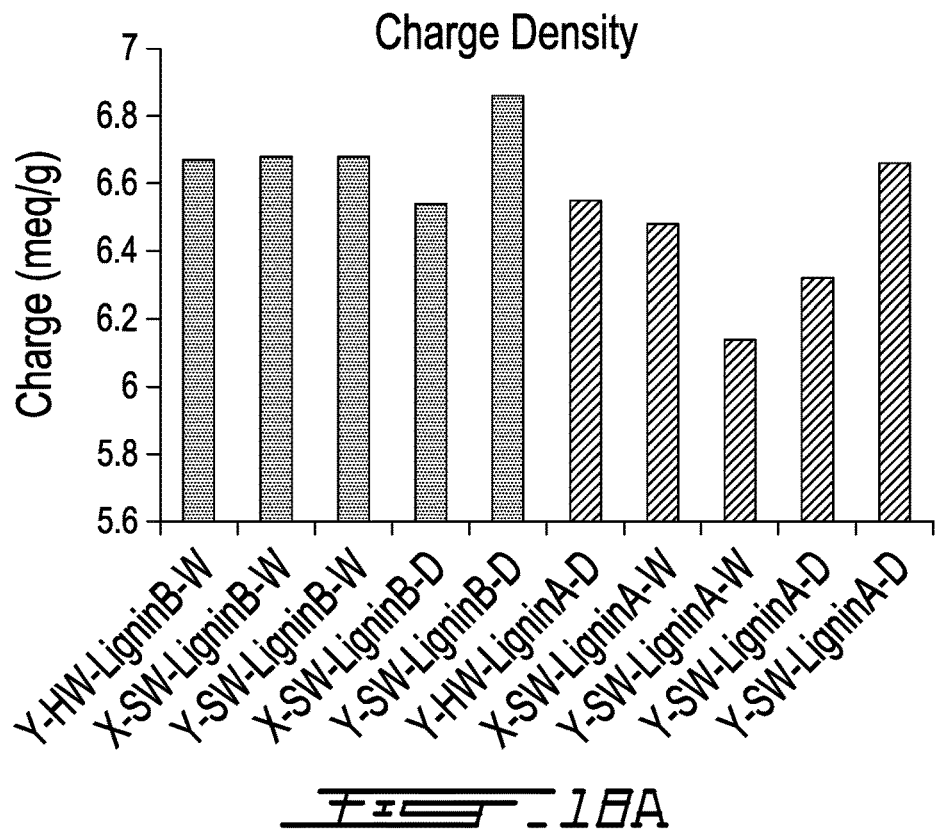
Figure 18B:
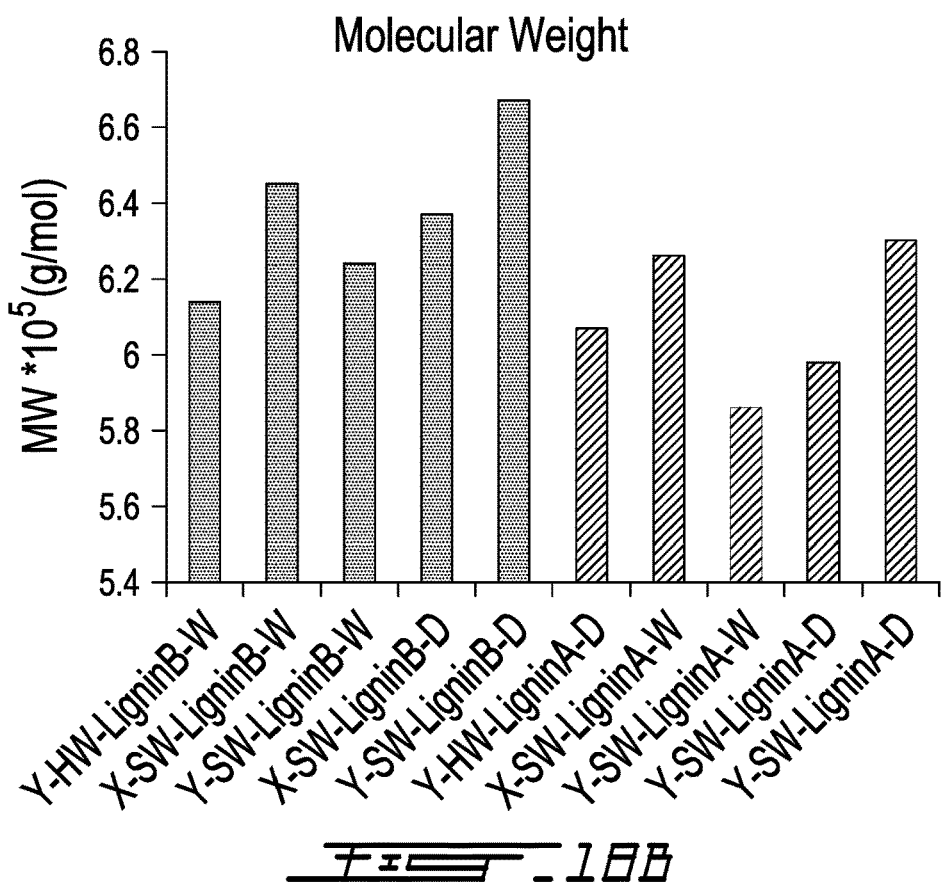
Figure 19A:
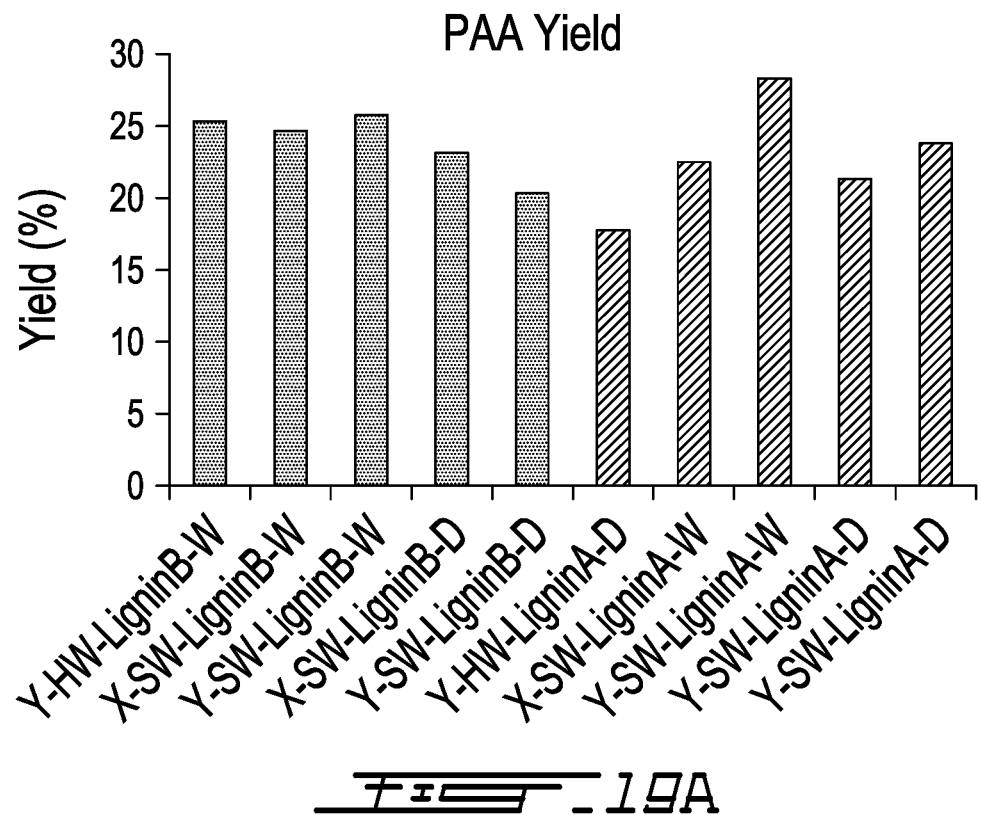
Figure 19B:
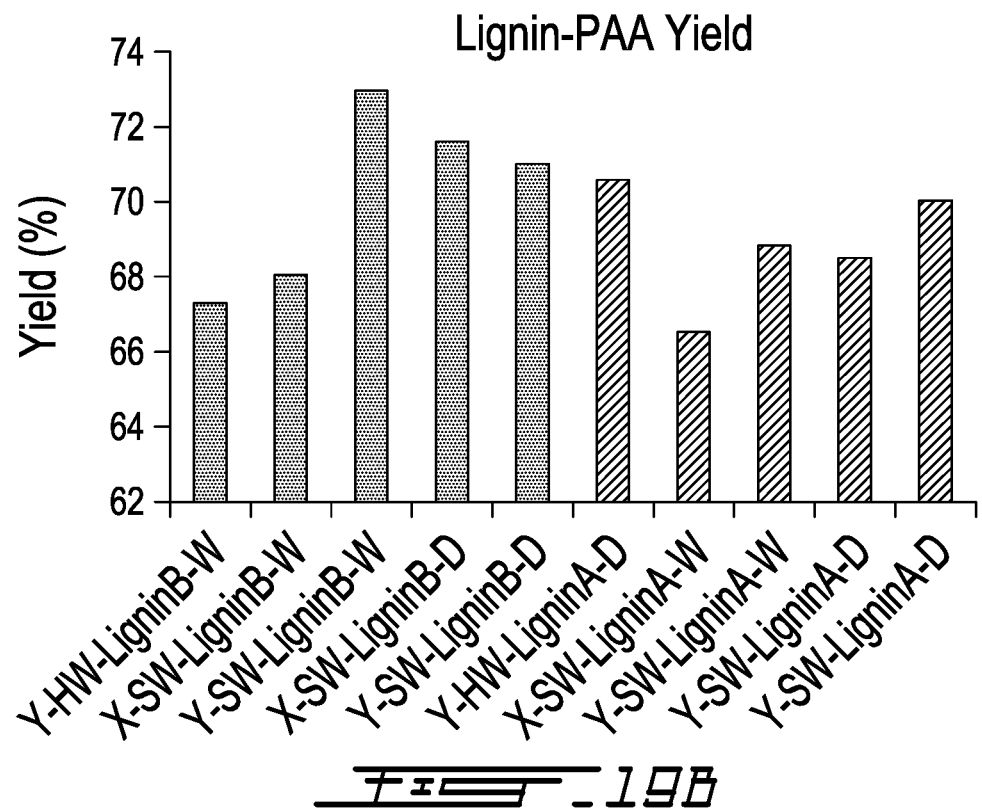
Figure 20A:
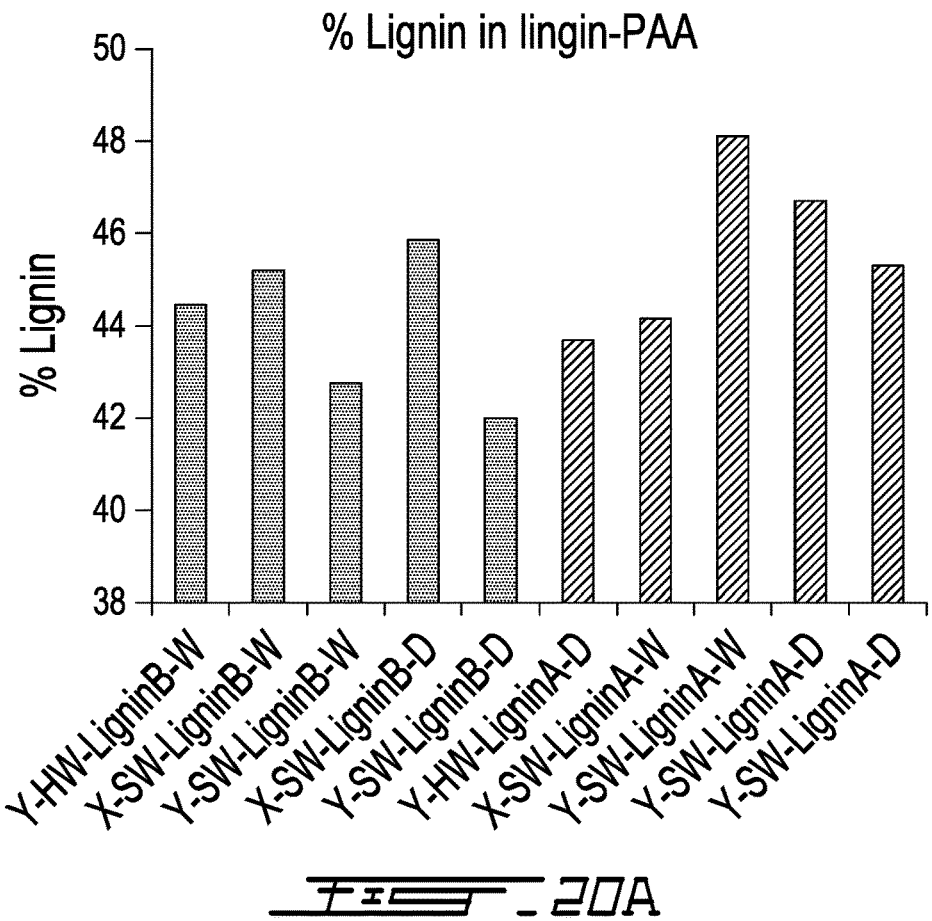
Figure 20B:
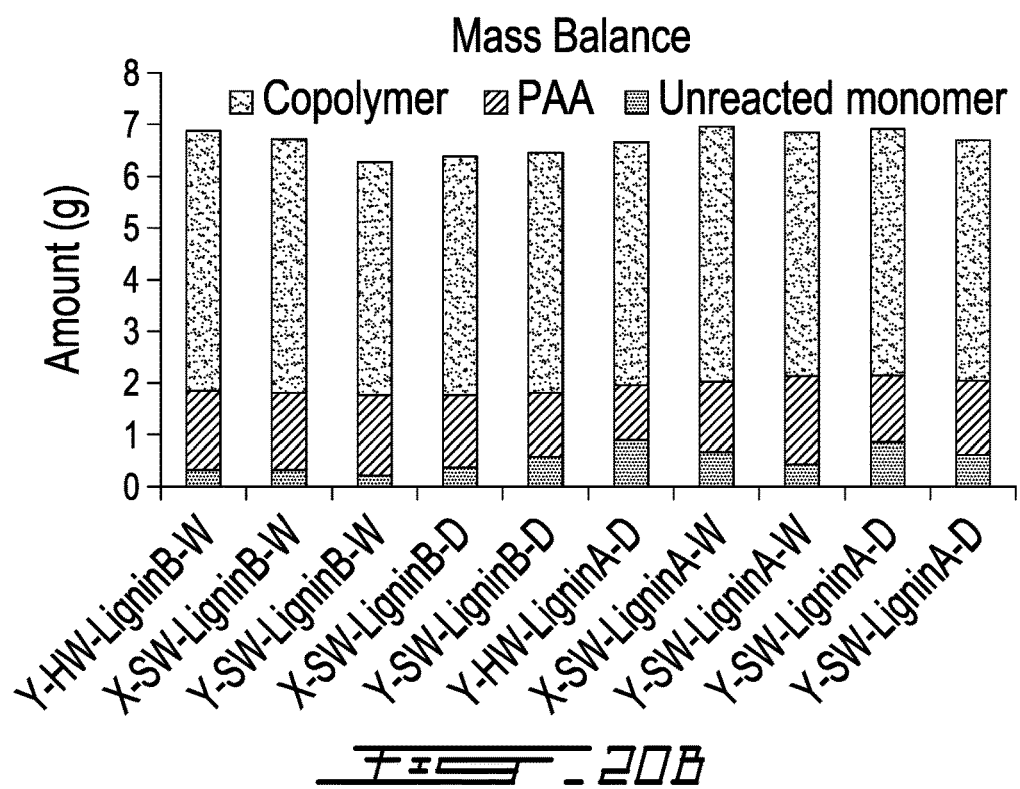
Figure 21A:
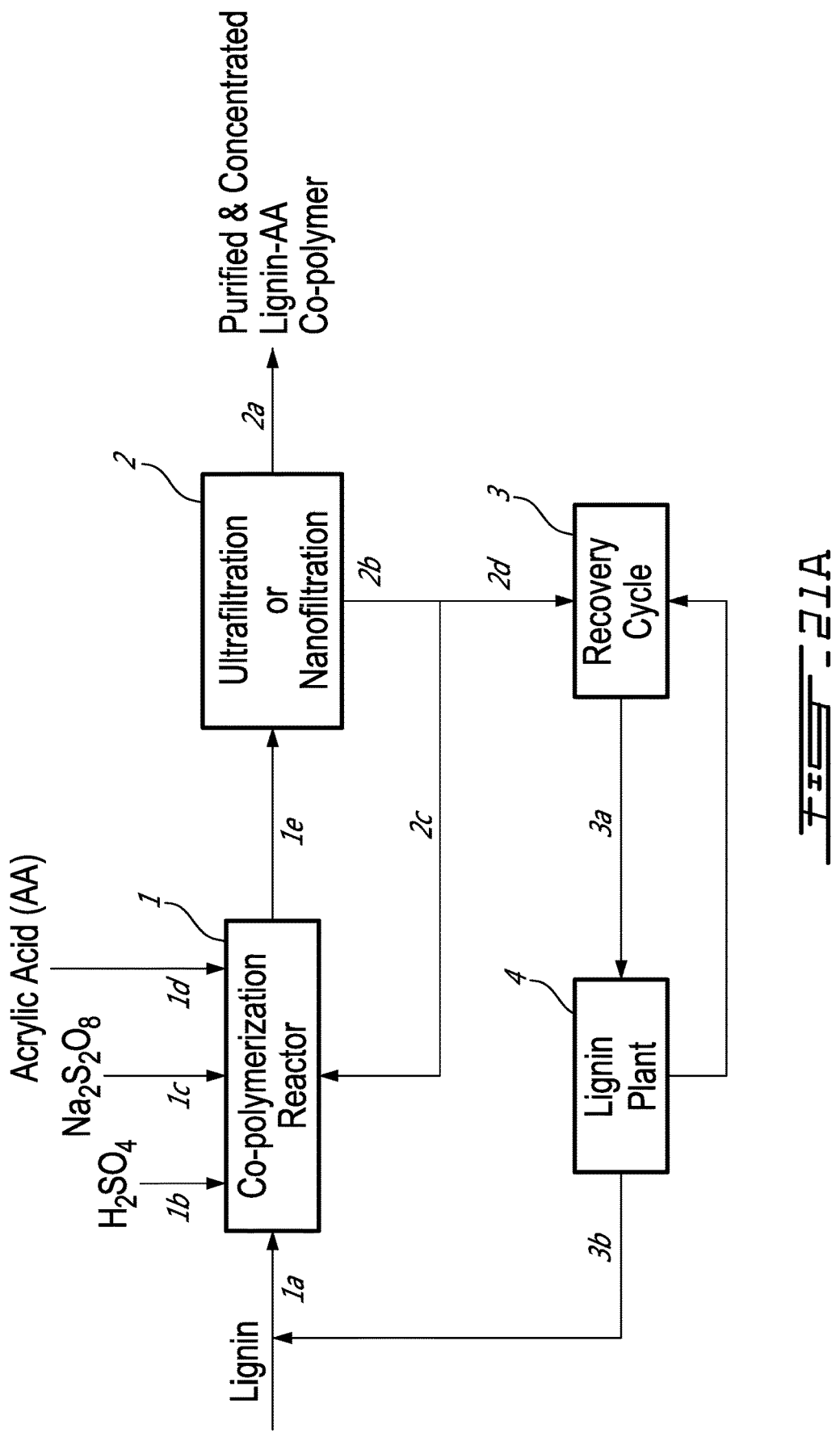
Figure 21B:
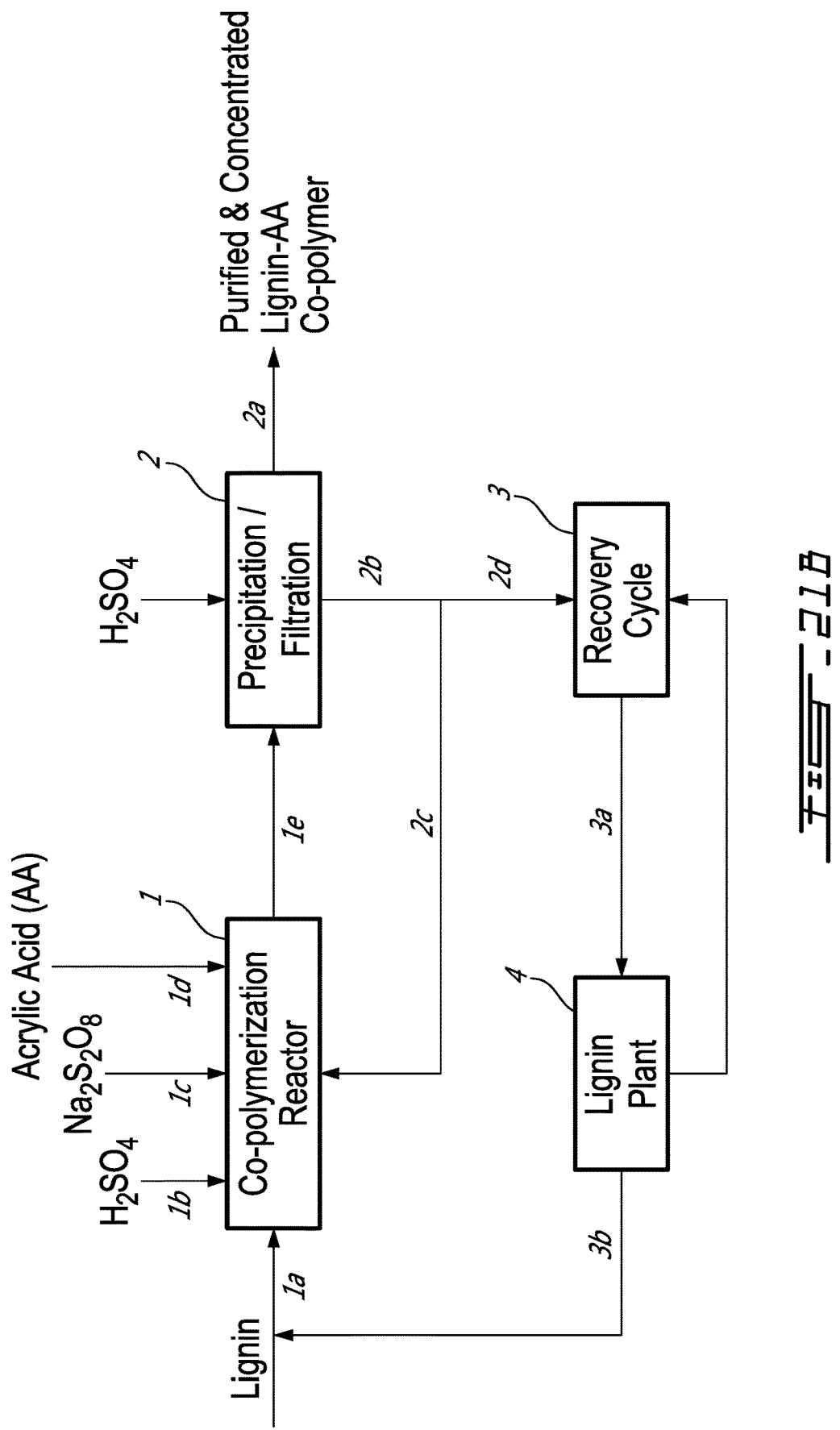
Figure 22:
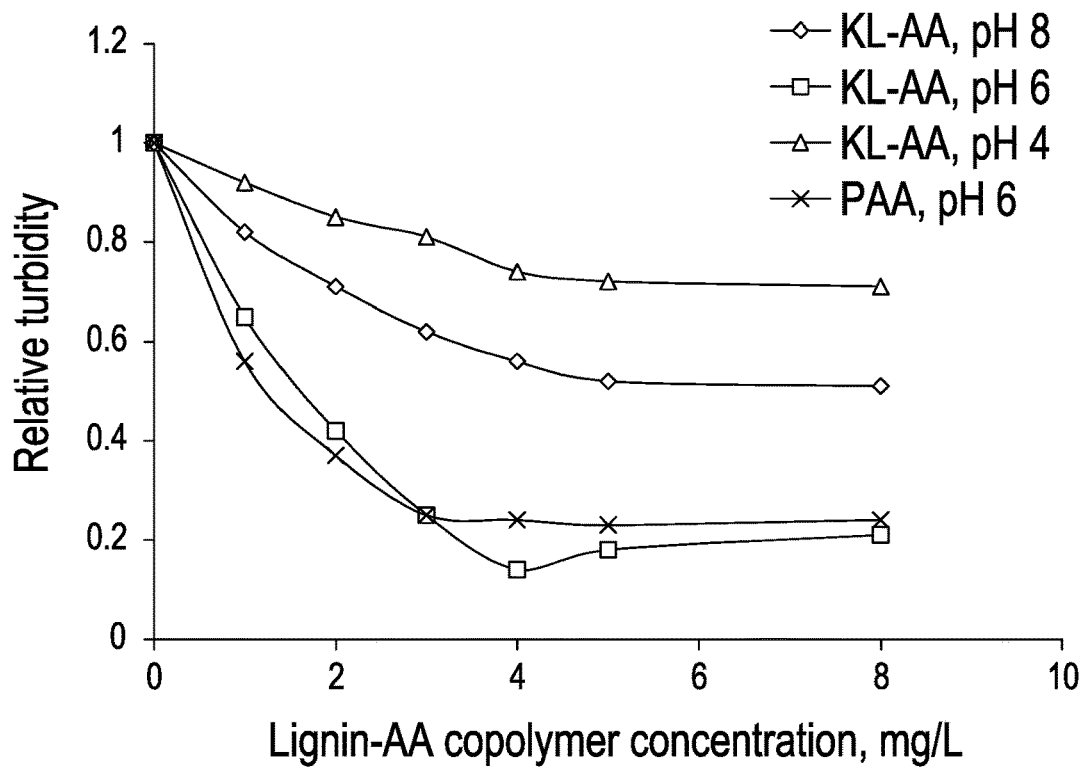
Figure 23:
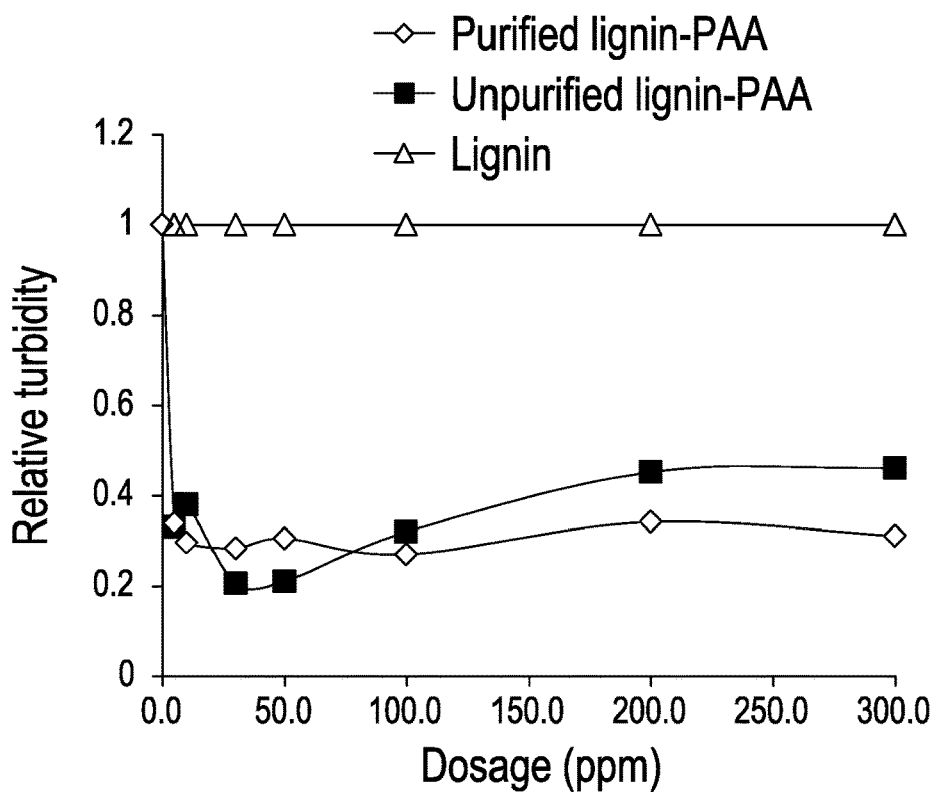

lignin concentration (mol/L) ((pH=3.5, initiator charge=1.5 wt. %, AA/lignin molar ratio=10.0, reaction time=3 h, temperature=80° C.);

FIG. 11 is a graph of carboxylate group content (mmol/g) of lignin-AA copolymer vs. molecular weight (g/mol) (based on 1.5 wt. % initiator charge) and Hy, hydrodynamic diameter (nm);

FIG. 12 presents Fourier Transform Infrared (FTIR) spectra of KL-AA copolymer (upper curve) and KL (lower curve);

FIG. 13 presents $^1$H-NMR spectra of KL (upper curve) and KL-AA copolymer (lower curve) in $D_2O$;

FIG. 14 is a graph of pH vs. solubility of KL-AA copolymer and KL (g/L) at 10 g/L concentration;

FIG. 15 is a graph of hydrodynamic diameter (Hy) of KL-AA copolymer vs. pH, where the upper curve illustrates decreasing the pH from alkaline conditions and the lower curve illustrates increasing the pH from acidic conditions;

FIG. 16 is a graph of the viscosity (cPa) of lignin-AA copolymer at different concentrations and pH levels (pH 10, 8, 6, and 4 from top to bottom, respectively) each at 25° C.;

FIG. 17 is a graph of the viscosity (cPa) of KL-AA copolymer solutions at a concentration of 50 g/L vs. shear rate (rpm) at 25° C. and two pH levels;

FIG. 18A is a series of bar graphs showing the charge density (meq/g) of lignin-AA copolymers produced from Lignin A (LRC lignin) (the five bars on the right side of 18A) or Lignin B (HRC lignin) (the five bars on the left side of 18A);

FIG. 18B is a series of bar graphs showing the Molecular weight (g/mol) of lignin-AA copolymers produced from Lignin A (LRC lignin) (the five bars on the right side of 18B) or Lignin B (HRC lignin) (the five bars on the left side of 18B);

FIG. 19A is a series of bar graphs showing PAA Yield (%) following the copolymerization reaction between AA and Lignin A (LRC lignin) (the five bars on the right side of 19A) or Lignin B (HRC lignin) (the five bars on the left side of 19A);

FIG. 19B is a series of bar graphs showing Lignin-AA Yield (%) following the copolymerization reaction between Lignin A (LRC lignin) (the five bars on the right side of 19B) or Lignin B (HRC lignin) (the five bars on the left side of 19B);

FIG. 20A is a series of bar graphs showing lignin content (%) in lignin-AA copolymers produced from Lignin A (LRC lignin) (red) or Lignin B (HRC lignin) (blue);

FIG. 20B is a series of bar graphs showing the mass balance in the reaction products arising from the reaction of lignin with AA to produce lignin-AA copolymers using 10 different types of lignin;

FIG. 21A is a Process Block Diagram for lignin-AA production in which ultrafiltration/nanofiltration is used to purify/concentrate the copolymer product;

FIG. 21B is a Process Block Diagram for lignin-AA production in which acid precipitation/filtration is used to purify/concentrate the copolymer product;

FIG. 22 is a graph of relative turbidity of an alumina suspension versus KL-AA copolymer concentration (mg/L) and PAA alone at varying pHs for illustrating flocculation performance, and FIG. 23 is a graph of relative turbidity of an alumina suspension versus a dosage of Lignin (not copolymerized), Purified lignin-AA, and unpurified lignin-AA at a pH 6 for 10 minutes, illustrating the superior flocculation of an alumina suspension using purified or unpurified KL-AA versus lignin (that had no effect on the turbidity).

DETAILED DESCRIPTION

In the context of this invention, the copolymerization of kraft lignin with acrylic acid in an acidic aqueous solution was conducted using as an initiator, preferably $K_2S_2O_8$. In one aspect of the invention, a process is described to generate a water soluble lignin-AA copolymer with a high molecular weight, which will facilitate its application in wastewater or mining tailing pond treatment systems. In another aspect of the invention, the copolymerization of acrylic acid with the phenolic groups in lignin was detailed. In a further aspect of the invention we investigated how the functional groups and molecular weight of kraft lignin are affected by this copolymerization. The properties of the lignin-AA copolymer were determined using several techniques, while the flocculation performance of the resulting lignin-AA copolymer for an alumina suspension, as a model suspension system, was evaluated using a photometric dispersion analyzer.

Surprisingly, it was found that it is possible to prepare lignin-AA copolymers at high reaction yield and selectivity, especially when HRC kraft lignin is used under acidic conditions. The chemical composition of HRC lignin as compared to LRC lignin is shown in Table 1. As seen in this table, for example, the ash content of HRC lignin could be as high as 182× the ash content of LRC lignin while the sodium content of HRC lignin could be as high as 169× the sodium content of LRC lignin.

TABLE 1

| Lignin composition | | |
|---|---|---|
| | HRC softwood kraft lignin | LRC softwood kraft lignin |
| Ash, wt. % | 1.9-20 | 0.11-1.8 |
| pH | 3.8-10.5 | 2-3.7 |
| Organics, wt. % | 80-87.1 | 98.2-99.9 |
| Lignin, wt. % | 56.4-72.2 | 90.9-99.9 |
| Acid-insoluble lignin, wt. % | 49.9-73.6 | 89.3-97.8 |
| Acid-soluble lignin, wt. % | 1.17-6.71 | 1.25-3.88 |
| Na, wt. % | 0.12-10 | 0.059-0.9 |
| S, wt. % | 1.41-2.93 | 1.46-2.38 |
| Sugars, wt. % | 0.7-2.92 | 1.23-2.4 |
| HHV, BTU/lb | 6378-9517 | 10797-11851 |
| C, % | 47.3-58.4 | 65.8-68.1 |
| H, % | 4.4-5.9 | 5.8-6.0 |
| N, % | 0.02-0.07 | 0.03-0.04 |

Such HRC lignin-AA copolymers demonstrated high MW, thermal stability, charge density and solubility in water. In addition, such copolymers are expected to demonstrate an exceptional ability to act as flocculants in wastewater and process applications (e.g. in mining and textile dye industries) including municipal and industrial systems as well as sludge dewatering applications in the textile dye, pulp & paper, mining and oil industries.

The anionic lignin copolymers described herein can also be dispersants in applications where the molecules or particles to be dispersed are negatively charged (e.g. concrete admixtures, gypsum slurries, negatively charged dissolved dye molecules, etc.). In the case of dispersants, the co-polymer would preferably be of lower molecular weight (e.g. 5,000-50,000 Dalton) rather than 90,000-740,000 Dalton which is preferred in the case of flocculants Materials and Methods In all experiments conducted for the purposes of this invention, softwood kraft lignin samples (HRC and LRC content lignins) were received from the FPInnovations LignoForce™ demo plant in Thunder Bay, ON. The kraft lignins were produced via the LignoForce™ technology[20] Acrylic acid (AA), potassium persulfate ($K_2S_2O_8$) (analytical grades), sodium hydroxide (97%, reagent grade), hydrochloric acid (37%, reagent grade), potassium hydroxide (8 mol/L solution), 0.1 mol/L hydrochloric acid, dimethyl sulphate and para-hydroxybenzoic acid (analytical grades) were obtained from Sigma-Aldrich Company, and used as received. Dialysis membranes (Cut off of 1000 g/mol) were obtained from Spectrum Labs.

Copolymerization of KL with AA

The reactions were carried out in a nitrogen atmosphere in 250-mL three-necked flasks equipped with magnetic stirrers. A 2-g sample of lignin was suspended in 30 mL of deionized water at room temperature and stirred at 300 rpm for 20 min. Then, the required amount of AA was added to the flasks and the final pH of the suspension was adjusted to 3.5 using a 1.0 mol/L NaOH solution. Subsequently, the temperature of the flasks was adjusted by keeping the flasks in a water bath and the solution was purged with nitrogen for 20 min. A predetermined amount of initiator ($K_2S_2O_8$, wt. % based on lignin weight) was then added to the flasks in order to initiate the reaction. A continuous supply of nitrogen was maintained throughout the reaction. The copolymerization reaction was repeated at different temperatures (60° C., 70° C., 80° C., 90° C. and 95° C.), time intervals (0.5 h, 1 h, 2 h, 3 h, 4 h and 5 h), free radical initiator dosages (0.5 wt. %, 1.0 wt. %, 1.5 wt. %, 2.0 wt. %, 2.5 wt. % and 3.0 wt. %, based on lignin weight), AA to lignin mole ratios (1.35, 2.70, 5.4, 8.0, 10, 13.5 and 16.3) and lignin concentrations (0.07 mol/L, 0.1 mol/L, 0.15 mol/L, 0.22 mol/L and 0.38 mol/L) in order to optimize the reaction conditions.

Purifying Lignin-AA Copolymer

The purification of the lignin-AA copolymer was carried out according to the following procedure: The reaction solution was first acidified to a pH of 1.5 to precipitate the lignin-AA copolymer, and then centrifuged to remove any PAA homopolymer and unreacted AA monomer from the lignin-AA copolymer.

PAA Prepared from AA and KL-AA Systems

The PAA from KL-AA system (in presence of KL) was prepared at a pH of 3.5, lignin concentration 0.15 mol/L, AA/lignin molar ratio 8.0, 80° C., 3 h and 1.5 wt. % initiator. The PAA from AA system (in absence of KL) was prepared under the same conditions but in the absence of KL In both cases, after the reaction, the reaction solution was acidified to pH 1.5 to precipitate the lignin-AA copolymer, and then the solution was centrifuged to separate any residual PAA homopolymer and unreacted AA monomer from the lignin-AA copolymer.

Reaction of KL with PAA

In one set of experiments, the PAA (produced in AA system) was added to KL under the conditions of 0.15 mol/L of lignin, 8.0 mol/mol of PAA/KL, 1.5 wt. % initiator (based on lignin weight), 80° C., 3 h and pH 3.5. After the reaction, the solution was purified as stated above and the final product was analyzed by $^1H$ NMR spectroscopy.

AA Conversion Analysis

The AA conversion in the reaction was determined by $^1H$ NMR spectroscopy. In this set of experiments, 0.2 mL of reaction solution was collected and then mixed with 0.8 mL $D_2O$ containing 5 mg/mL trimethylsilyl propanoic acid (TMSP) as an internal reference. The NMR spectra of these samples were recorded using an INOVA-500 MHz instrument (Varian, USA) with a 45° pulse and relaxation delay time of 1.0 s. The area under the peak at 5.95-6.05 ppm was used to determine the concentration of unreacted AA, $C_1$, in the reaction solution. The AA conversion was calculated using equation (1):

$$AA \text{ conversion}, \% = \frac{C_0 - C_1}{C_0} \times 100 \quad (1)$$

Where $C_0$ was the initial AA concentration in the reaction solution, mol/L and C, was the unreacted AA concentration in reaction solution, mol/L Acetylation of Lignin In order to understand if there are other reaction sites on KL (in addition to phenolic hydroxyl groups) that react with AA under acidic conditions, the acetylation of lignin was carried out according to a method described by Andes et al.[22] In this set of experiments, 0.5 g KL was dissolved in 6 mL of pyridine-acetic anhydride (1/1, v/v) by stirring for 30 min at 300 rpm, 25° C. and then kept in the dark at room temperature for 72 h. The solution was added dropwise to 120 mL of cold water and then centrifuged and washed 3 times. The solvent was removed from the sample using a freeze dryer and the final product was considered as acetylated lignin sample.

Methylation of KL

In order to understand the relationship between Ph-OH group content of KL and its copolymerization with AA, KL was methylated according to the following procedure:23 a 1.0 g of KL was dissolved in 15 mL of 0.7 mol/L NaOH solution at room temperature by stirring at 300 rpm for 20 min. After that, 0.25 mmol, 0.50 mmol or 1.0 mmol of dimethyl sulphate was added per each mmol of total phenolic hydroxyl groups of KL, and the solution was stirred at room temperature for 30 min. The solution was then heated to 80° C. for 2 h. During the reaction, the pH of the solution was kept at 11-11.5 by a continuous addition of 0.7 mol/L NaOH solution. Upon the completion of the reaction, the solution was acidified to pH 2.5 using 2 mol/L HCl solution and the resulting precipitate was washed with an excess amount of deionized water until a neutral pH was obtained. The resulting brown precipitates were then dried under a reduced pressure. The final product was considered as methylated KL. The methylation conditions and the content of phenolic hydroxyl group of methylated KLs are listed in Table 2.

TABLE 2

Methylation conditions and Ph—OH content of methylated lignin.

| Sample | KL | 1 | 2 | 3 |
|---|---|---|---|---|
| dimethyl sulphate/phenolic group of KL, mol/mol | 0 | 0.25 | 0.50 | 1.0 |
| Ph—OH groups, mmol/g lignin | 1.73 | 1.41 | 1.02 | 0.70 |
| Carboxylate groups, mmol/g lignin | 0.37 | 0.38 | 0.36 | 0.36 |

$H_2O_2$ Treatment of Kraft Lignin

In order to further examine the influence of Ph-OH content of KL on the copolymerization efficiency in the presence of carboxylate groups, hydrogen peroxide was used to treat KL in order to vary the Ph-OH and carboxylate group content. The treatment conditions and the properties of treated samples are listed in Table 3. After the treatment, the solution was neutralized using 1.0 mol/L $H_2SO_4$ and dialyzed for 48 h using the aforementioned membrane dialysis. The samples collected from the dialysis membranes were dried and considered as peroxide-treated KL in this study.

TABLE 3

Hydrogen peroxide treatment conditions and Ph—OH content of peroxide-treated lignin.

| Sample | Lignin concentration, wt. % | $H_2O_2$, wt. %, based on lignin | Time, h | Temperature, °C. | Carboxylate group, mmol/g | Ph—OH, mmol/g |
|---|---|---|---|---|---|---|
| 1 | 5 | 18 | 1 | 90 | 1.65 | 0.74 |
| 2 | 5 | 8 | 1 | 80 | 1.06 | 0.95 |
| 3 | 5 | 4 | 1 | 80 | 0.65 | 1.23 |
| 4 | 5 | 4 | 0.5 | 80 | 0.43 | 1.39 |
| KL | — | — | — | — | 0.37 | 1.73 |

Copolymerization of Treated Lignins with AA

The copolymerization conditions of acetylated KL, methylated KL and peroxide-treated KL with AA were fixed at pH 3.5, lignin concentration 0.15 mol/L, AA/lignin molar ratio 8.0, 80° C., 3 h and 1.5 wt. % initiator. After copolymerization, the copolymer was purified as described above. The carboxylate group content was measured according to the method detailed in the following section, the increased carboxyl group of lignin was determined (via subtracting the carboxylate group of KL from the total carboxylate group of lignin-AA copolymer).

Measurement of Unreacted Kraft Lignin in the Copolymerization

As stated previously, unreacted KL may exist in the final lignin-AA copolymer after the reaction. In order to evaluate this, acetone was used to extract the unreacted lignin from lignin-AA copolymer samples using a soxhlet extractor for 12 h. In this case, the unreacted lignin can be extracted from the lignin-AA copolymer, as kraft lignin is soluble in acetone, but lignin-AA copolymer is insoluble.[24,25] Initially, a certain amount (about 2.0-2.5 g) of sample, $M_0$, was maintained in a pre-extracted filter paper, and then the samples were extracted with acetone for 12 h. After the extraction, the sample was air-dried and then dried in the oven at 105° C. for 12 h. The final mass of the sample, $M_1$, was weighed and the percentage of unreacted lignin was calculated using equation (2):

$$\text{Unreacted lignin \%} = 100 \times \frac{M0 - M1}{M0} \quad (2)$$

Functional Group Analysis

The carboxylate group and Ph-OH contents of lignin and lignin-AA copolymers were measured using an automatic potentiometric titrator (785 DMP Titrino™, Metrohm, Switzerland). About 0.06 g of dried KL or lignin-AA copolymer, m, was added to 100 mL of deionized water containing 1 mL of 0.8 mol/L potassium hydroxide in a 250 mL beaker. After stirring at 200 rpm for 5 min, 4 mL of 0.5% para-hydroxybenzoic acid solution was added as an internal standard, and the solution was titrated with a 0.1 mol/L hydrochloric acid solution. During the titration, with the decrease in the pH of the sample solutions, three endpoints appeared in sequence ($V_1'$, $V_2'$ and $V_3'$, respectively). The corresponding three endpoints in the titration curve of a blank sample were specified as $V_1$, $V_2$ and $V_3$, respectively. The carboxylate group and Ph-OH contents of the samples were calculated according to equations (3) and (4).[26] The reported data in this paper is the average of three repetitions.

$$\text{phenolic hydroxyl group} \left(\frac{\text{mmol}}{\text{g}}\right) = \frac{C_{HCl}[(V_2' - V_1') - (V_2 - V_1)]}{m} \quad (3)$$

$$\text{carboxylate group} \left(\frac{\text{mmol}}{\text{g}}\right) = \frac{C_{HCl}[(V_3' - V_2') - (V_3 - V_2)]}{m} \quad (4)$$

where $C_{HCl}$ is the concentration of HCl solution (0.1 mmol/L) as titrant and m is the mass (g) of the sample.

Molecular Weight Analysis

The molecular weight of the samples was measured using a Gel Permeation Chromatography system, Malvern™ GPCmax VE2001 Module+Viscotek™ TDA305 with multi-detectors (UV, RI, viscometer, low angle and right angle laser detectors). For KL MW distribution measurement, the columns PAS106M, PAS103 and PAS102.5 were used with the flow rate of the tetrahydrofuran (THF) mobile phase adjusted to 1.0 mL/min. For the lignin-AA copolymer MW distribution measurement, the columns PAA206 and PAA203 were used with the flow rate of an aqueous mobile phase (0.1 mol/L in $NaNO_3$) adjusted to 0.70 mL/min. The column temperature was set at 35° C. for both systems. Polystyrene polymers were used as standards for the organic mobile phase GPC system and poly (ethylene oxide) for the aqueous mobile phase GPC system.

About 100 mg of air dried KL was initially suspended in 4.0 mL of acetic anhydride/pyridine 1:1 (V:V) solution by stirring for 30 min at 300 rpm at 25° C. and then the solution containing KL was kept in a dark place at 25° C. for 24 h to acetylate KL The resulting solution was then poured in an excess amount (50 mL) of ice water and centrifuged/washed 3 times. Afterwards, the solvent was removed from the samples using a freeze dryer. The acetylated KL was dissolved in 10 mL of tetrahydrofuran (THF) by stirring at 300 rpm for 30 min at room temperature, and then filtered with a PTFE filter having a diameter of 13 mm and a pore size of 0.2 μm. The filtered samples were used for molecular weight analysis. For lignin-AA copolymer analysis, about 50 mg of air dried copolymer sample was dissolved in 10 mL of 0.1 mol/L $NaNO_3$ solution and filtered with a nylon 0.2 μm filter (13 mm diameter). The filtered solutions were used for molecular weight analysis.

Hydrodynamic Diameter Measurement of Lignin-AA Copolymer

The hydrodynamic diameters of lignin-AA copolymers were measured using a dynamic light scattering analyzer (type BI-200SM Brookhaven Instruments Corp., USA). The light source was a power solid state laser with a maximum power of 35 mW and a wavelength of 637 nm. The experimental procedure was as described by Yan et al.[27] The lignin-AA copolymer was dissolved in 1 mg/mL NaCl solution at pH 10.5 to make a 0.2 wt. % copolymer solution. The obtained solution was stirred for 30 min at 300 rpm at 25° C. For the measurement of KL-AA copolymer at different pHs, an initial KL-AA copolymer solution was made at pH 12.0, and then the pH was decreased gradually to 4 and then increased to 12. The pH of the solution was adjusted using 0.1 mol/L HCl and 0.1 mol/L NaOH solution. The solution was then kept for 24 h without stirring to have a well-dissolved copolymer in the solution. The sample solution of 20 mL was then filtered with a 0.45 μm disposable syringe filter prior to the size measurement. Five measurements were performed for each sample and the mean value was reported. The analysis was conducted at 25±0.02° C. The scattering angle was set at 90°.

Elemental Analysis

Elemental analysis was performed for KL and lignin-AA copolymer using Elementar Vario EL Cube Elemental Analyzer by a method described in the literature.[28] The samples were dried in an oven at 105° C. overnight in order to remove any moisture. Approximately, 2 mg of sample were used to determine the carbon, hydrogen and oxygen contents in the samples.

Fourier Transform Infrared (FTIR)

Fourier Transform Infrared Spectroscopy (FTIR) analysis was conducted on KL and lignin-AA copolymers. The samples were dried in an oven at 105° C. overnight and 0.05 g of the sample was used for analysis using FTIR (Bruker Tensor 37, Germany, ATR accessory). The spectra were recorded in transmittance mode in the range 600 $cm^{-1}$ and 4000 $cm^{-1}$ with 4 $cm^{-1}$ resolution, using 32 scans per sample.

$^1$H-NMR Analysis

The KL and lignin-AA copolymer were analyzed using $^1$H-NMR spectroscopy. The samples of dried KL and lignin-AA copolymer were dissolved into $D_2O$ at pH 10.2 and a concentration of 40-50 g/L. The other samples in this study were dissolved in DMSO-$d_6$ at a 40-50 g/L concentration. The solution was stirred for 30 min to fully dissolve the material. The $^1$H NMR spectra of these samples were recorded using an INOVA-500 MHz instrument (Varian, USA) with a 45° pulse and relaxation delay time of 1.0 s.

Solubility Analysis of KL and Lignin-AA Copolymer

The solubility of KL and lignin-AA copolymer was determined based on the method described by Lappan et al.[29] About 0.5 g of KL or lignin-AA copolymer was added to 50 mL of deionized water at different pHs using 1.0 mol/L NaOH or 1.0 mol/L $H_2SO_4$ solution in a 125 mL Erlenmeyer flask to adjust the pH. The suspension was immersed into a water bath shaker (Innova 3100, Brunswick Scientific, Edison, N.J., USA) and shaken (100 rpm) at 30° C. for 2 h. Then, the suspension was centrifuged at 1000 rpm for 5 min. The supernatants were collected and dried at 105° C., which helped determine the solubility of KL and lignin-AA copolymer in water at different pHs. To determine the solubility of KL or lignin-AA copolymer, the mass of NaOH or $H_2SO_4$ added for adjusting the pH was taken into account.

Viscosity Measurement

The viscosity of lignin-AA copolymers was measured at different concentrations at 25° C. using a Brookfield DV-II+ Pro viscometer. The measurement was conducted in aqueous solutions at different pHs at 25° C. In this set of experiments, different concentrations of lignin-AA copolymer solutions at different pH levels were placed in a viscometer equipped with spindle NO. S61, and the spindle rotation was adjusted from 1 to 100 rpm to measure the viscosity of the samples.

Flocculation of Alumina Suspension

The flocculation performance of lignin-AA copolymers in an alumina suspension was evaluated by a photometric dispersion analyzer (PDA, PDA 3000, Rank Brothers, UK) connected to a dynamic drainage jar (DDJ). In this set of experiments, 450 mL of deionized water at different pH levels was poured into the DDJ without any mesh. The system circulated water through PDA and DDJ for 10 min to reach a steady flow rate of 50 ml/min. Then, 50 mL of a 2.5 wt. % alumina suspension at different pHs was added to the DDJ while stirring at 100 rpm. The suspension was circulated in the system continuously at a flow rate of 50 mL/min. After reaching steady-state conditions, the lignin-AA copolymer solution at a concentration of 0.1 g/L was added into the DDJ to induce the flocculation process. The degree of flocculation was presented as a relative turbidity, which was calculated from the variations in the DC voltage of the PDA analyzer before and after adding lignin-AA copolymer according to equation (5):[30,31]

$$\tau_r = \frac{\tau_f}{\tau_i} = \frac{\ln\left(\frac{V_0}{V_f}\right)}{\ln\left(\frac{V_0}{V_i}\right)} \quad (5)$$

where $\tau_i$ is the initial turbidity of the alumina suspension (before adding lignin-AA copolymer); $\tau_f$ is the final turbidity of alumina suspension (after adding lignin-AA copolymer); $V_0$ is initial base DC voltage (water solution); $V_i$ stands for the DC voltage of alumina suspension (without lignin-AA copolymer); and $V_f$ is the DC voltage of the alumina suspension after adding lignin-AA copolymer.

Reaction Mechanism of Copolymerization of KL and AA

In this study, the copolymerization of KL and AA was carried out in an acidic aqueous solution through a heterogeneous reaction. To clarify if KL and PAA react via esterification, the PAA prepared in this study was used for investigating reaction between KL and PAA with and without initiator. The H-NMR analysis of the products of KL and PAA reaction showed that no PAA was grafted onto KL illustrating i) the esterification reaction between the carboxylate groups of PAA and aliphatic hydroxyl groups of KL did not occur in the acidic system, ii) the terminated PAA formed during the copolymerization reaction of KL and AA could not be reinitiated to form KL-AA copolymers.

It was reported that the copolymerization of styrene and hydrochloric acid lignin did not occur at the aromatic ring, methoxyl groups or the purely aliphatic portions of lignin molecules.[18,32] In our previous work, we described that the copolymerization did not occur on those groups in alkaline homogenous reaction of KL and AA[21]. Due to the low bond dissociation energies of $C_6H_5O$—H (89.8 kcal·$mol^{-1}$) and $C_6H_5CH_2$—H (90 kcal·$mol^{-1}$) among chemical groups in KL,[32,33] the predominant lignin radicals, which are induced through the homolytic rupture of KL during the copolymerization reaction under aqueous acidic conditions, are phenoxyl radicals from phenolic lignin units and with some smaller probability of benzylic radicals from non-phenolic lignin units. It was also reported in the literature[33] that acetylated lignin models had significantly lower free radicals (benzylic radicals) than the untreated lignin samples. To determine whether the copolymerization of KL and AA occurs through the benzylic radicals in the acidic conditions, the acetylated KL was used to copolymerize with AA. The final product was analyzed using $^1$H-NMR and showed that the characteristic peaks of PAA did not exist on the product of acetylated KL and AA, demonstrating that: i) the copolymerization of AA onto KL through benzylic radicals was not detectable in acidic system, ii) in the absence of the phenolic hydroxyl groups in KL, the aromatic ring, methoxyl group and aliphatic portion of lignin molecules did not participate in the reaction, iii) in the absence of phenolic hydroxyl groups in KL, the copolymerization of AA and KL was not observed under in acidic conditions, and iv) the phenoxyl radicals of KL were the predominant free radicals participating in the acidic copolymerization of KL and AA.

In addition to the lignin radicals formed by the initiator, the chain transfer reactions of KL and the growing PAA radicals may also form lignin radicals. To determine if KL functions as a free radical transfer agent in this system, the molecular weight of PAA formed in the absence and presence of KL was measured (FIG. 1).

Figure 1:
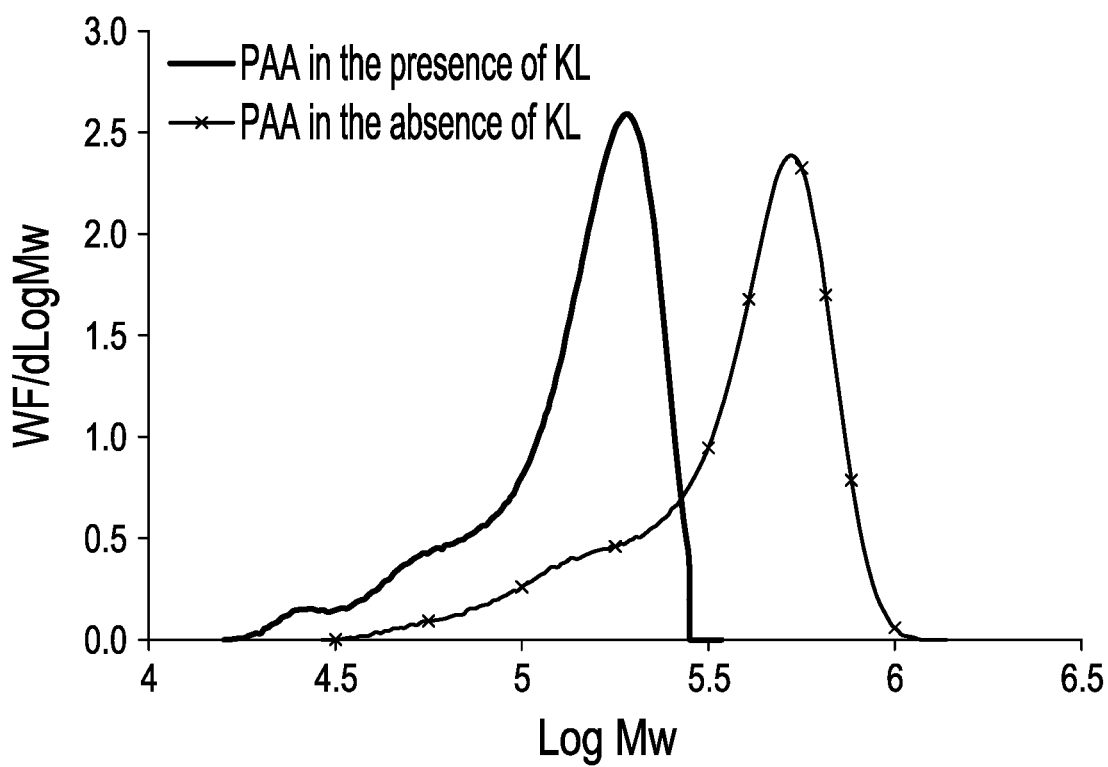
FIG. 1 is a graph of Log Mw (Molecular Weight) vs. WF/dLog Mw distribution of molecular weight of PAA from KL-AA in the presence (left hand curve max Log Mw ~5.2) and absence of KL (right hand curve max Log Mw ~5.7)
Figure 2:
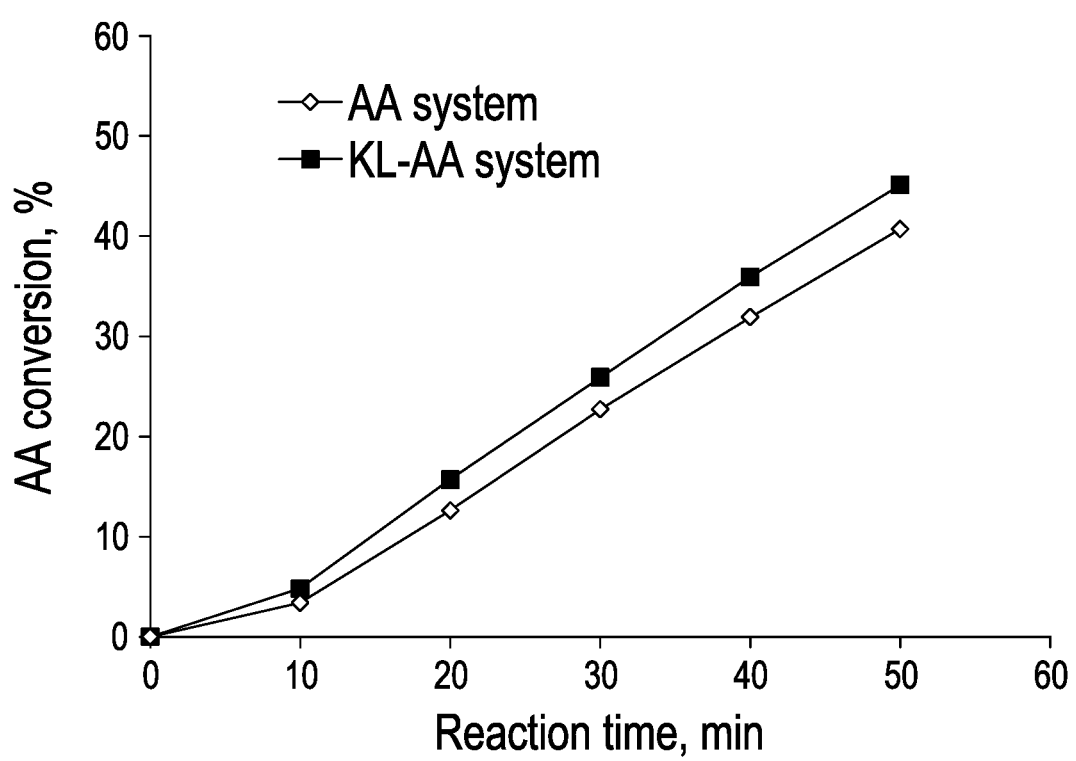
FIG. 2 is a graph of reaction time (min) vs. Acrylic Acid conversion % in a KL-AA system and AA system.

Based on the results in FIG. 1, the molecular weight of PAA in the presence of KL (111,700 g/mol) was much lower than that in the absence of KL (426,300 g/mol), illustrating: i) KL functioned as a chain transfer agent in this copolymerization system, ii) the chain transfer reaction between KL and PAA chain radicals formed some lignin radicals for this copolymerization. It is well known that chain transfer in polymerization systems not only results in a reduced molecular weight of the polymer, but may also affect the polymerization rate, which depends on the re-initiation reaction rate between chain transfer radicals and monomers. In order to understand the effect of KL on the polymerization rate, the AA conversion in KL-AA copolymerization system and AA homopolymerization system was determined and shown in FIG. 2. It is apparent that the KL slightly increased the AA conversion, illustrating the re-initiation reaction rate between lignin radicals and monomers is similar or slightly higher than that of the propagation reaction of AA chain radicals, which is also consistent with the findings in the copolymerization of lignosulfonate with AA in the literature.[18]

Based on the analysis above, the proposed reaction scheme of this copolymerization is shown in Scheme 1. As softwood KL is known to be composed principally of coniferyl alcohol units,[34] it was chosen to present KL in this Scheme. In this copolymerization reaction, the sulfate radicals can initially be formed by thermal decomposition (reaction (1)), which initiate AA to form AA radicals (AA·). The AA radicals can then react with other AA monomers to form PAA chain radicals (reaction (2)).[8,10] The sulfate radicals can also react with phenolic hydroxyl groups in KL to generate phenoxy radicals and its resonance radicals (reaction (3)). These KL radicals (lignin.) can react with the AA monomer to form the propagated lignin-AA chain radicals (reaction (4)). In addition, the PAA chain radicals and lignin-AA radicals in this system can also react with KL to form KL radicals through a chain radical transfer reaction (reaction (5)), and the KL radicals can then reinitiate AA to form lignin-AA chain radicals (reaction (6)). Finally, the propagated AA chain radicals and propagated lignin-AA chain radicals can react with each other to produce PAA homopolymer and lignin-AA copolymer through a termination reaction shown in reaction 7. In this copolymerization, the carboxylate groups are introduced onto KL and the molecular weight is increased.

Figure 3:
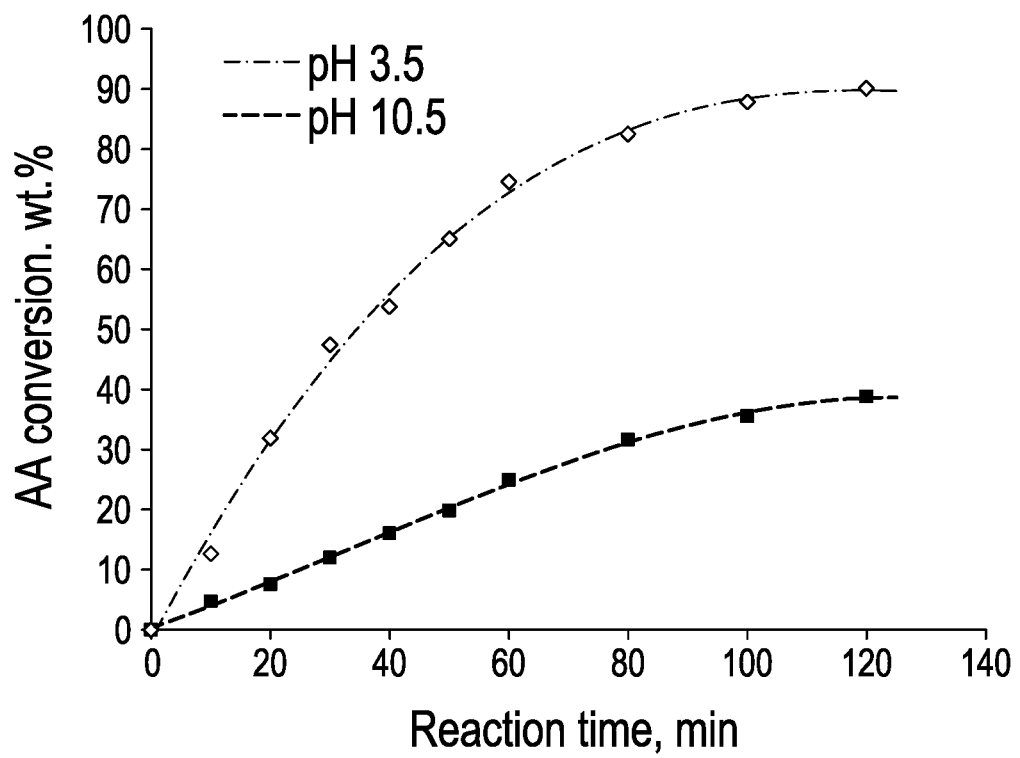
FIG. 3 is a graph of reaction time (min) vs. Acrylic Acid conversion, wt. % in an AA system at pH 3.5 and 10.5.

Compared with the homogeneous copolymerization of KL and AA under alkaline conditions, the heterogeneous copolymerization under acidic conditions has a similar reaction mechanism. However, the final KL-AA copolymer from these two systems has a very different charge density (−1.86 meq/g under alkaline vs −7.22 meq/g under acidic conditions) and molecular weight (0.46×10$^5$ g/mol under alkaline vs 7.4×10$^5$ g/mol under acidic conditions). To understand the reason for this behavior, the homopolymerization of AA to PAA at pH 3.5 and pH 10.5 was measured and presented in FIG. 3. As seen, the conversion of AA to PAA at pH 3.5 is much higher than that at pH 10.5. Furthermore, the AA conversion to PAA at pH 3.5 reached 90.1% in 2 h, however, it was only 38.8% at pH 10.5. In addition, the molecular weight of PAA synthesized at pH 3.5 and pH 10.5 were determined to be 4.26×10$^5$ g/mol and 0.83×10$^5$ g/mol, respectively. This phenomenon was also observed by Catalgil-Giz et al. in the polymerization of acrylic acid.[35] One can conclude that the higher charge density and higher molecular weight of KL-AA copolymer prepared under acidic conditions (pH 3.5) was mainly attributed to the higher AA conversion to PAA.

(1)

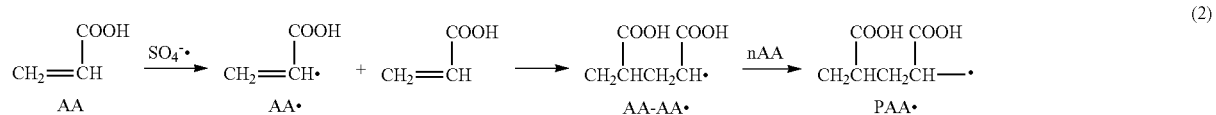

(2)

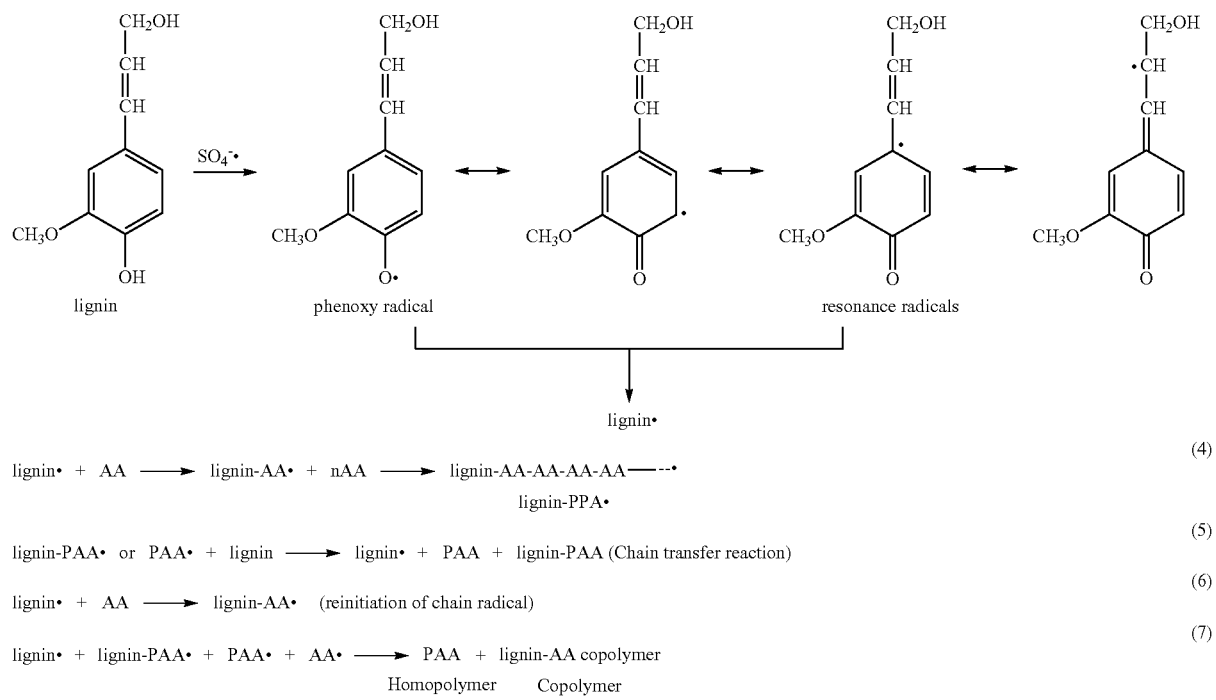

(3)

lignin•  +  AA  ⟶  lignin-AA•  +  nAA  ⟶  lignin-AA-AA-AA-AA----•  
                                                             lignin-PPA• (4)

lignin-PAA•  or  PAA•  +  lignin  ⟶  lignin•  +  PAA  +  lignin-PAA (Chain transfer reaction) (5)

lignin•  +  AA  ⟶  lignin-AA•   (reinitiation of chain radical) (6)

lignin•  +  lignin-PAA•  +  PAA•  +  AA•  ⟶  PAA  +  lignin-AA copolymer (7)
                                                         Homopolymer    Copolymer Scheme 1. Proposed reaction scheme of copolymerization of KL and AA initiated by $K_2S_2O_8$.

As shown in Scheme 1, the OH group on the phenolic structure of KL is converted to an ether or a carbonyl group in the final copolymer product and this would reduce the Ph-OH content of the copolymer. To examine this, the Ph-OH content of KL before and after treating with initiator was measured. The Ph-OH content of KL was 1.73 mmol/g, but it decreased to 1.59 mmol/g after the addition of $K_2S_2O_8$. After copolymerization with AA, the Ph-OH content of KL was further decreased to 0.546 mmol/g. One can conclude from this analysis that the Ph-OH content in KL declined during the copolymerization, and this decline was mainly attributed to the participation of Ph-OH in the copolymerization.

Figure 4:
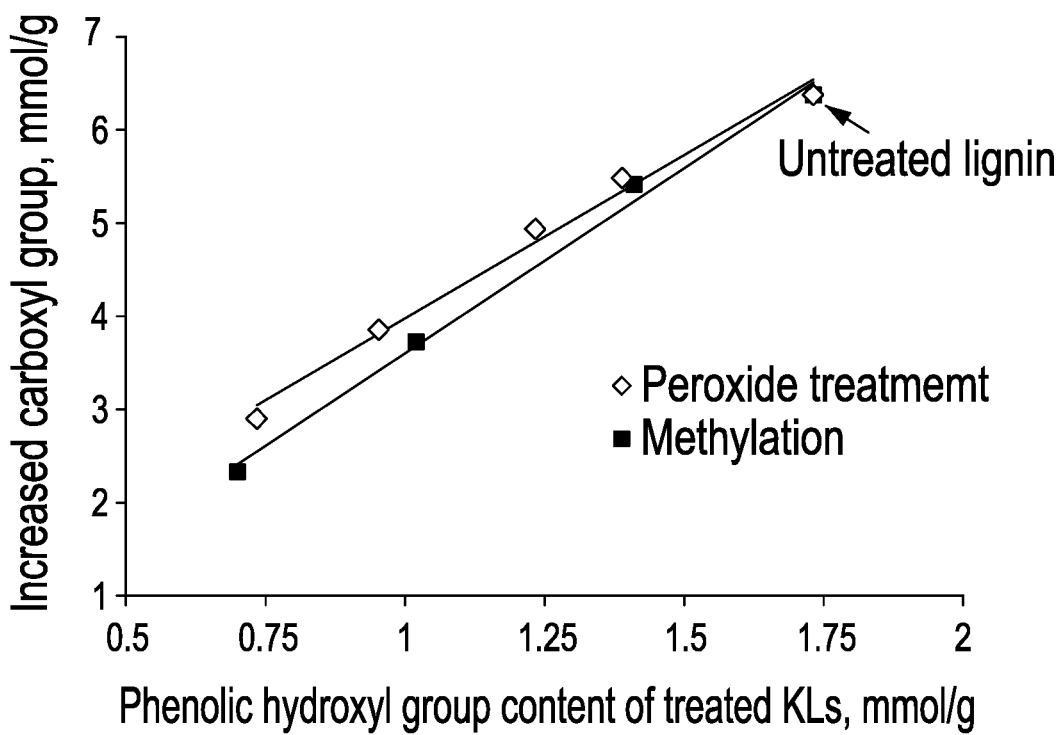
FIG. 4 is a graph of the relationship between phenolic hydroxyl group content on kraft lignin as and treated Kraft Lignin (mmol/g) vs. increased carboxylate group of KL-AA copolymer (mmol/g)

In another set of experiments, the impact of Ph-OH content of KL on the copolymerization efficiency was determined via treating KL with hydrogen peroxide, which can reduce the Ph-OH content of lignin.[36,37] The $H_2O_2$ treatment conditions and the Ph-OH content of treated lignin are listed in Table 3. As seen in Table 3, with increasing $H_2O_2$ dosage, temperature and time of treatment, the Ph-OH content of the resulting KLs decreased, but the carboxylate content of the treated KLs increased, due to the oxidation of KL by $H_2O_2$.[37,38] The treated and untreated KL was copolymerized with AA, and the carboxylate group of the resulting lignin-AA copolymer was measured. FIG. 4 presents the impact of the Ph-OH content of KL on the carboxylate content of the KL-AA copolymer. It can be seen that the Ph-OH content of lignin has a linear relationship with the increased carboxylate groups in the final copolymer, indicating that the OH groups attached to the phenolic structures in KL is the reaction site for the copolymerization.

To further assess the relationship between the phenolic hydroxyl groups of KL and increased carboxyl groups in the KL-AA copolymer, methylated lignin with different amounts of phenolic groups were copolymerized with AA. The increased carboxylate group content in the copolymers also shows a linear relationship with the phenolic hydroxyl group content in KL (FIG. 4), further demonstrating the importance of phenolic hydroxyl groups in KL for the copolymerization. It is also seen in this Figure that at high amount of phenolic hydroxyl groups on either peroxide-treated lignin or methylated lignin, the increased carboxylate groups on the lignin-AA copolymers are similar. However, decreasing the amount of the phenolic hydroxyl groups, the increased carboxylate group of the resulting copolymer was more pronounced for the peroxide-treated KL. The reasons for this phenomenon might be: i) the more open structure of lignin after peroxide treatment compared with that after methylation. ii) the lower molecular weight and higher solubility of peroxide-treated KL compared with methylated lignin. In other words, the more open structure provides a higher accessibility of AA to the reaction sites on KL. To clarify this, the acetylated peroxide-treated lignin was reacted with AA and the final product was analyzed using H-NMR. The results showed that AA did not copolymerize with the acetylated peroxide-treated lignin, illustrating the fact that there was no other reaction site on the peroxide-treated lignin. This demonstrates that the more significant increase in the carboxylate group of peroxide-treated lignin-AA copolymers is attributed to the increased accessibility of AA to the phenolic hydroxyl group of KL, as the reaction site for the copolymerization was still phenolic groups in the peroxide treated KL This phenomenon was also observed by Phillips et al[17] in the copolymerization of styrene and calcium lignosulfonate.

Participation of KL in Copolymerization.

To investigate the participation of lignin in the heterogeneous copolymerization with AA, acetone was used to extract any unreacted KL from the lignin-AA copolymer after the copolymerization. The results of this analysis are listed in Table 4. In the absence of AA in the reaction, the percentage of unreacted lignin reached 98.8%, demonstrating that the lignin properties were not affected either by the initiator or the acid treatment. In the absence of the initiator, the percent of unreacted lignin was higher than 99%, indicative of no reaction. However, in the presence of AA, initiator and KL in the copolymerization, the unreacted lignin was minimal (only 0.61 wt. %-1.13 wt. %). Furthermore, the reaction was very fast as the amount of unreacted lignin was marginal even after 30 min. One can conclude from the analysis that almost all of the KL present in the reaction participated in the copolymerization with AA under acidic conditions.

TABLE 4

Reaction conditions and percentage of unreacted KL.

| Sample | AA/lignin molar ratio, n:1 | Time, h | Initiator, wt. % on lignin mass | Percentage of unreacted lignin, % |
|---|---|---|---|---|
| 1 | 1:1 | 0.5 | 1.5 | 1.07 |
| 2 | 1:1 | 2 | 1.5 | 1.13 |
| 3 | 0.5:1 | 2 | 1.5 | 1.08 |
| 4 | 2:1 | 2 | 1.5 | 0.61 |
| 5 | 1:1 | 2 | 0 | 99.3 |
| 6 | 0:1 | 2 | 1.5 | 98.8 |
| 7 | 0:1 | 2 | 0 | 99.5 |

Other reaction conditions: temperature 80° C., lignin concentration 0.15 mol/L, pH 3.5.

Reaction Optimization

Effects of Initiator Dosage and Type

Figure 5:
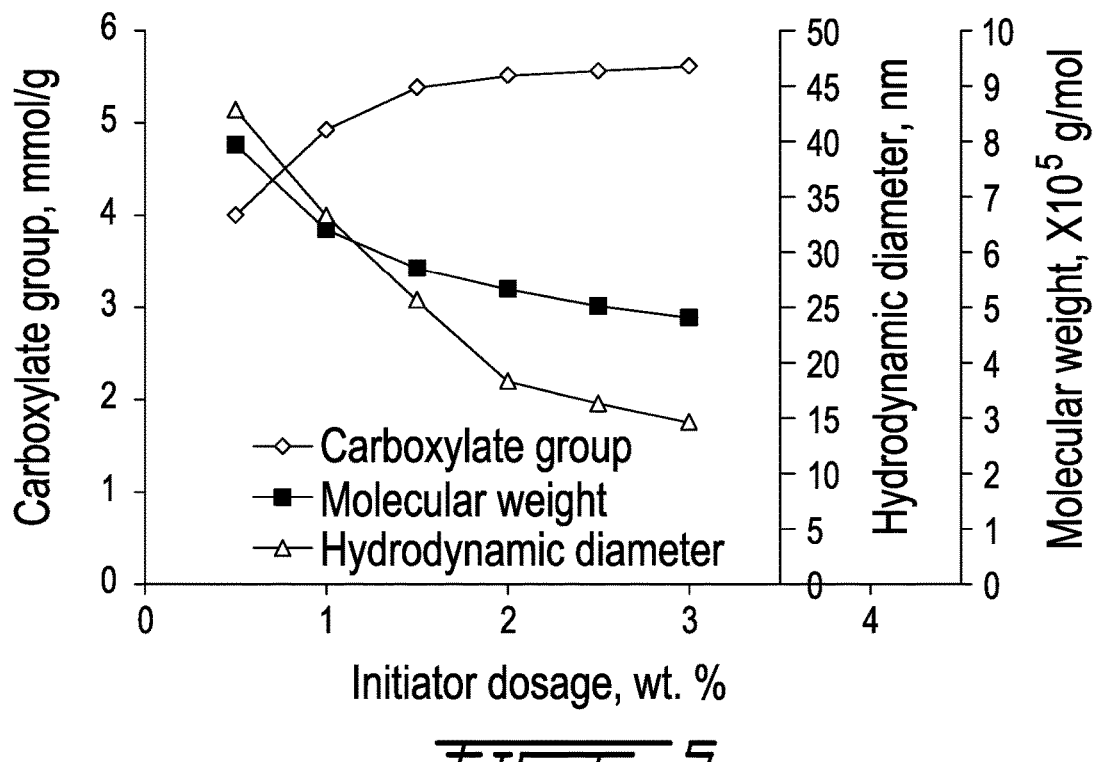
FIG. 5 is a graph of Carboxylate group content, molecular weight and hydrodynamic diameter of lignin-AA copolymer as a function of initiator dosage (pH 3.5, lignin concentration 0.15 mol/L, AA/lignin molar ratio 5.5, 80° C., 3 h)

The effect of initiator dosage on the carboxylate group content and molecular weight of lignin-AA copolymer was investigated and the results are shown in FIG. 5. With the increase in the initiator dosage from 0.5 wt. % to 1.5 wt. %, the carboxylate group content increased from 4.0 mmol/g to 5.38 mmol/g. A further increase in the dosage marginally increased the carboxylate group content. However, the molecular weight of lignin-AA copolymer decreased from $7.9 \times 10^5$ g/mol to $4.8 \times 10^5$ g/mol when the dosage of initiator increased from 0.5 to 3.0 wt. %. Decreasing the initiator dosage, fewer radicals (grafting cites) are generated on lignin, which results in a copolymer with a longer chain.[39,40] The hydrodynamic diameters of lignin-AA copolymers produced via using different initiator dosages are also presented in FIG. 5. With the increase in the initiator dosage, the hydrodynamic diameter of copolymer decreased, illustrating the copolymer produced at high initiator dosage had more of the shorter PAA segments. Therefore, the increase in carboxylate content, and the decrease in molecular weight and Hy reveal that by increasing the initiator dosage, a larger number of shorter PAA segments were grafted onto the KL The hydrodynamic diameter of KL was 6.1 nm.

Figure 6:
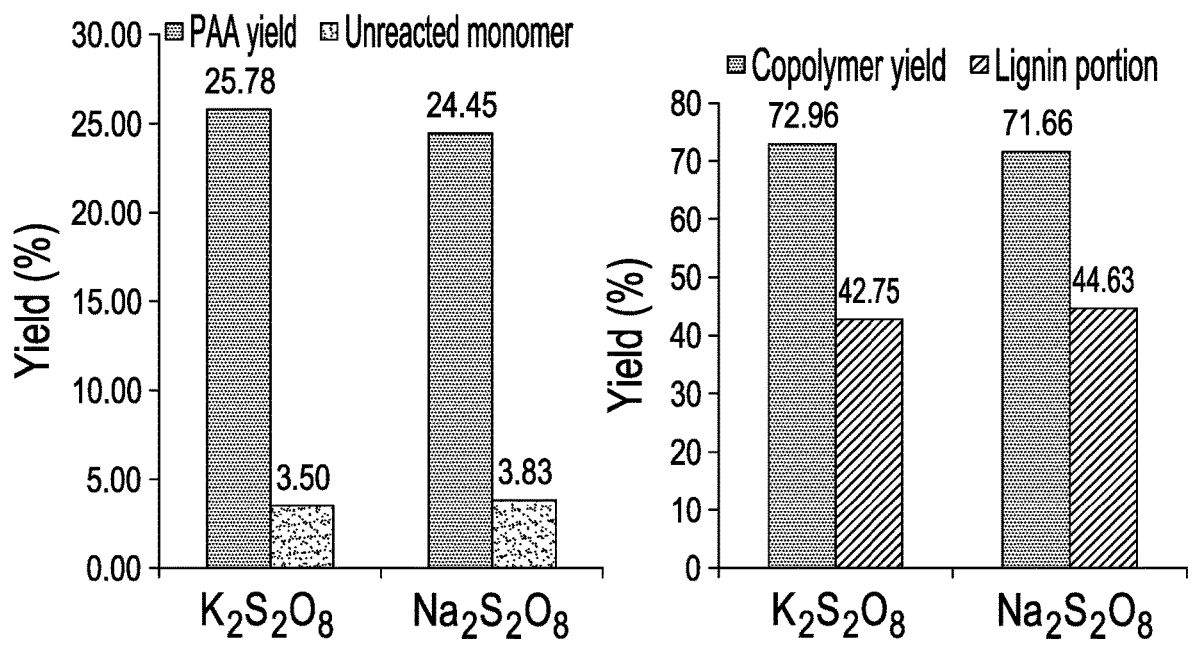
FIG. 6 is a bar graph comparing the effect of $K_2S_2O_8$ and $Na_2S_2O_8$ on PAA yield (25.78% and 24.45%, respectively), unreacted monomer yield (3.5% and 3.83%, respectively), copolymer yield (72.96% and 71.66%, respectively) and lignin proportion in the copolymer (42.75% and 44.63%, respectively)

In another set of experiments, two different types of initiators were used for the polymerization of lignin with PAA. Initially $K_2S_2O_8$ was used to initiate the polymerization, however, for this process to be integrated into a kraft pulping mill, potassium would need to be replaced with sodium. Therefore, the polymerization of lignin with PAA was also carried out using $Na_2S_2O_8$. The results can be found in FIGS. 6A and 6B. Examining the yield of PAA and unreacted AA measured after polymerization when either $K_2S_2O_8$ or $Na_2S_2O_8$ were used, these were 25.78% and 3.50%, respectively, in the case of the former and 24.45% and 3.83%, respectively, in the case of the latter. Examining the copolymer yield and proportion of lignin found in the lignin-PAA copolymer when either $K_2S_2O_8$ or $Na_2S_2O_8$ were used to initiate the polymerization was 72.96, 42.75% and 71.66, 44.63% respectively. Based on these results, $K_2S_2O_8$ or $Na_2S_2O_8$ can be used interchangeably and if this process was integrated into a kraft mill, $Na_2S_2O_8$ can preferably be used to initiate the lignin-PAA copolymerization, yield and lignin proportion.

Effect of Reaction Time

Figure 7:
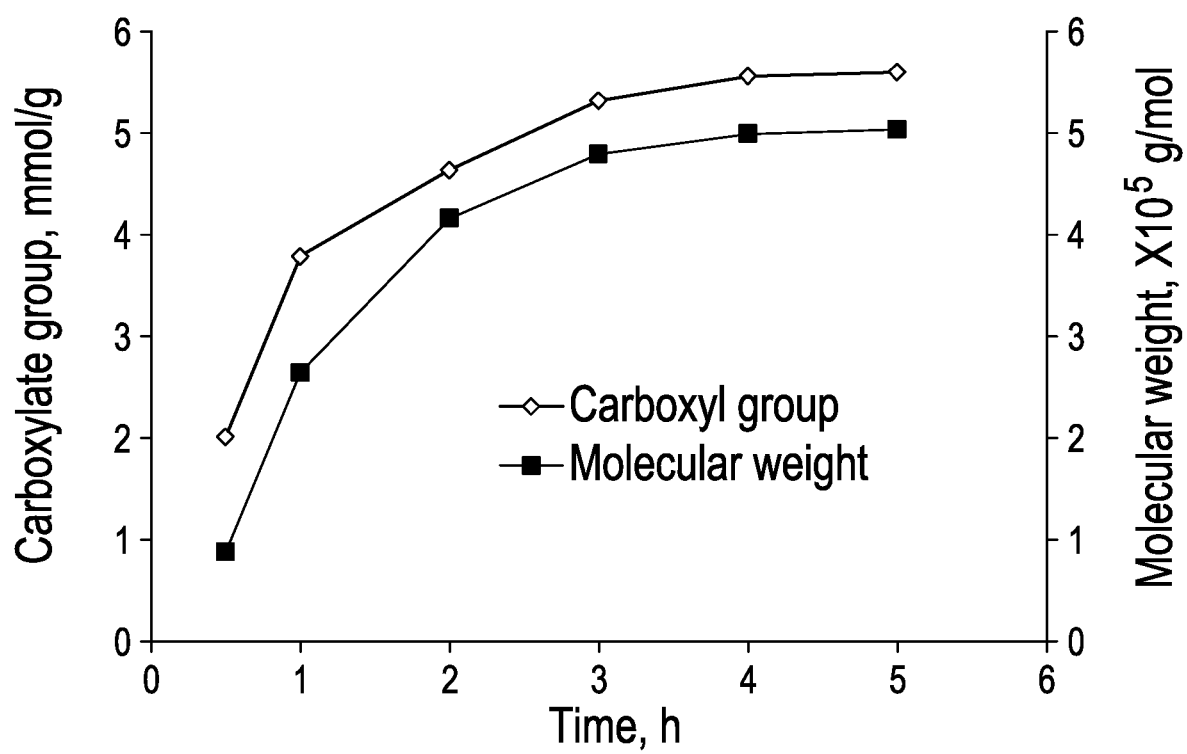
FIG. 7 is a graph of Carboxylate group content (mmol/g) and molecular weight of lignin-AA copolymer (g/mol) vs. reaction time (pH=3.5, initiator charge=1.5 wt. %, lignin concentration=0.15 mol/L, AA/lignin molar ratio=5.5, temperature=80° C.)

The effect of reaction time on the carboxylate group and molecular weight of lignin-AA copolymer are shown in FIG. 7. It can be seen that both carboxylate groups and molecular weight increased with extending the reaction time. The carboxylate group and molecular weight of lignin-AA copolymer significantly increased from 2 meq/g to 5.32 meq/g and from $1.0 \times 10^5$ to $5.0 \times 10^5$ g/mol, respectively. The increase in carboxylate group and molecular weight are attributed to the further addition of AA monomers to the growing grafted chains with increasing reaction time.[41,42]

Effect of AA/Lignin Molar Ratio

Figure 8:
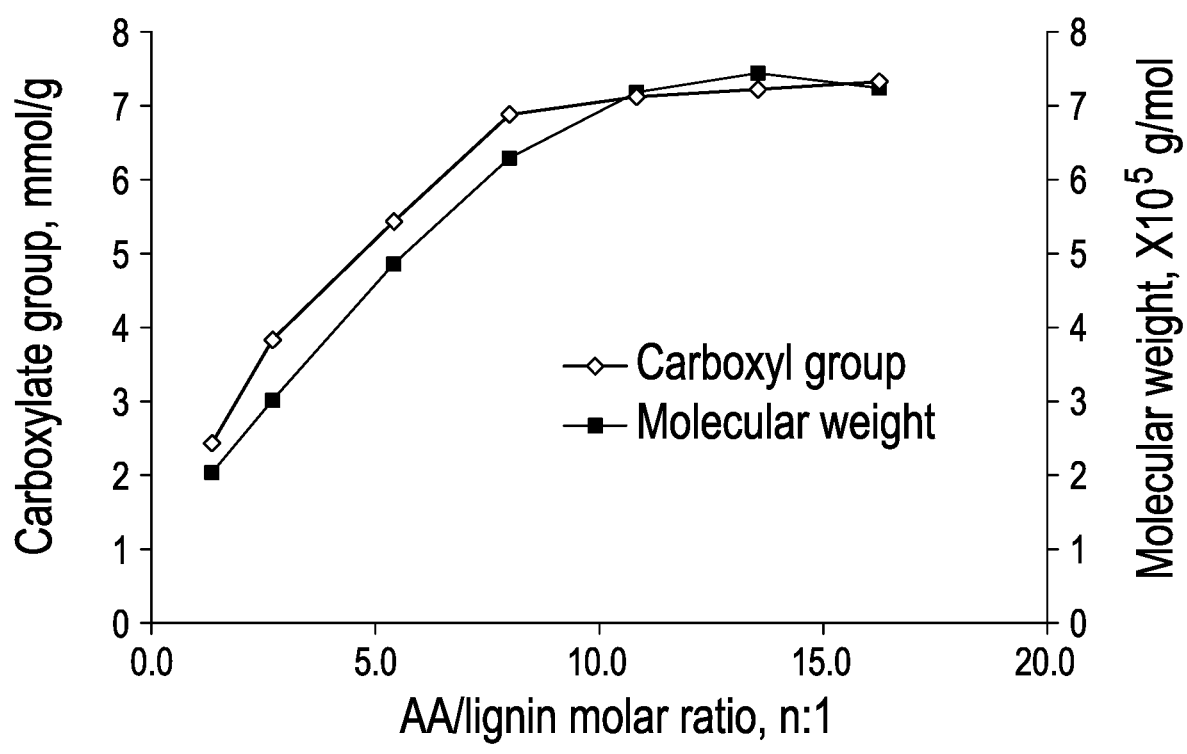
FIG. 8 is a graph of carboxylate group content (mmol/g) and molecular weight of lignin-AA copolymer (g/mol) vs. AA/lignin molar ratio (n:1) (at pH=3.5, initiator charge=1.5 wt. %, lignin concentration=0.15 mol/L, reaction time=3 h, temperature=80° C.)

The influence of AA/lignin molar ratio on the carboxylate group content and molecular weight of the copolymer was shown in FIG. 8. It can be seen that with an increase in AA/lignin molar ratio from 1.4 to 10.8, the carboxylate group content and molecular weight increased rapidly to 7 meq/g and $7.1 \times 10^5$ g/mol, respectively. A further increase in the ratio marginally affected the charge density and molecular weight of the copolymer. The increase in carboxylate group and molecular weight imply an increase in the copolymerization rate of lignin and AA due to increased AA content in the reaction medium.[43] However, when the ratio of AA/KL was higher than 13.5, the homopolymerization of AA to generate PAA was dominant and inhibited the copolymerization of KL with AA (carboxylate group and $M_w$ were constant).[41,44]

Effect of Temperature

Figure 9:
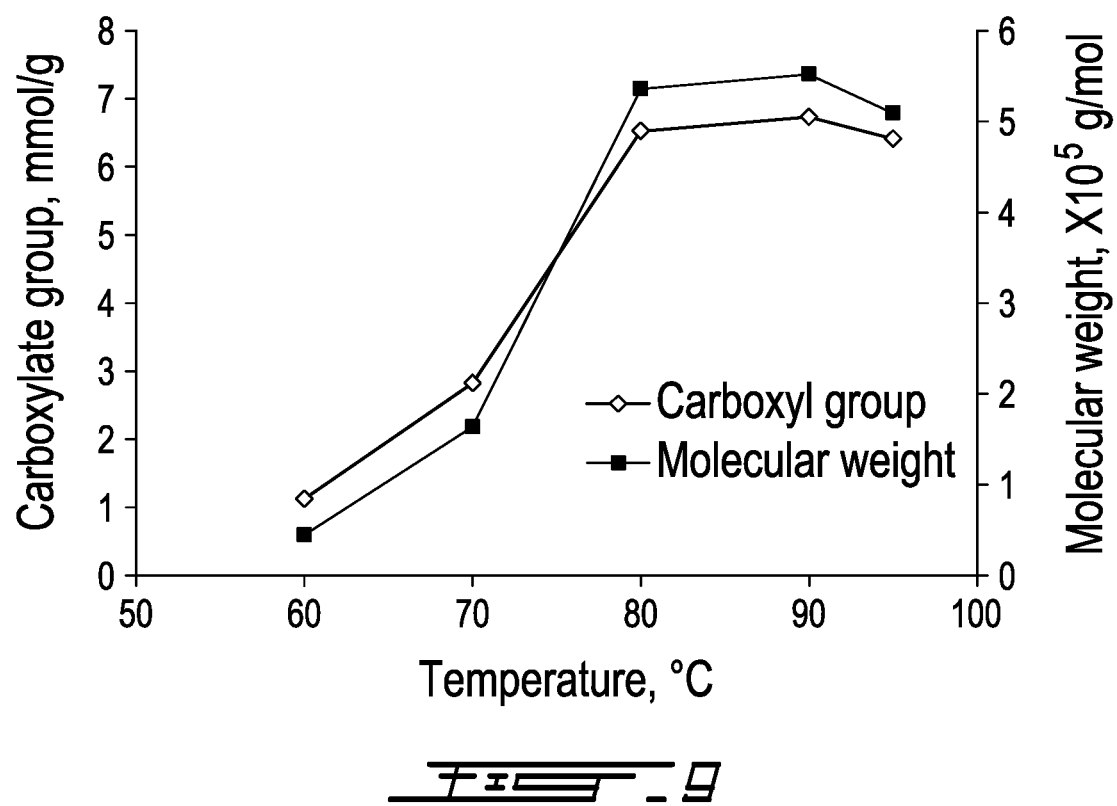
FIG. 9 is a graph of carboxylate group content (mmol/g) and molecular weight of lignin-AA copolymer (g/mol) vs. temperature (° C.) (at pH=3.5, initiator charge=1.5 wt. %, lignin concentration=0.15 mol/L, AA/lignin molar ratio=8.0, reaction time=3 h)

The effects of reaction temperature on the carboxylate group and molecular weight of lignin-AA copolymer are presented in FIG. 9. It can be seen that with an increase in the reaction temperature from 60° C. to 80° C., the carboxylate group content and molecular weight of lignin-AA copolymer increased dramatically from 1.12 mmol/g and $0.4 \times 10^5$ g/mol to 6.52 mmol/g and $5.4 \times 10^5$ g/mol, respectively. The increase in carboxylate groups and molecular weight are attributed to the more effective access of AA monomer to the reaction sites on the lignin at a higher temperature, which could be due to the extended conformation of lignin molecules and the dissociation of lignin from its self-assembly aggregates at a high temperature.[45,46] Another reason might be the faster reaction rate at a higher temperature. In addition, the results in FIG. 9 suggest that the copolymerization of KL with AA is an endothermic reaction as it was promoted at a higher temperature. When the temperature was higher than 90° C., both carboxylate group and molecular weight decreased. The decrease in the carboxylate group and molecular weight at a temperature higher than 90° C. is due to the fact that the higher temperature made the initiator less effective.[3,8] Alternatively, the higher temperature probably led to a higher concentration of free radicals, which would generate more termination reactions and hence lower carboxylate group content and molecular weight. Also, a high temperature favors the chain termination and chain transfer reactions as well as the competing homopolymerization (PAA) reaction.[9,18,25,43]

Effect of Lignin Concentration

Figure 10:
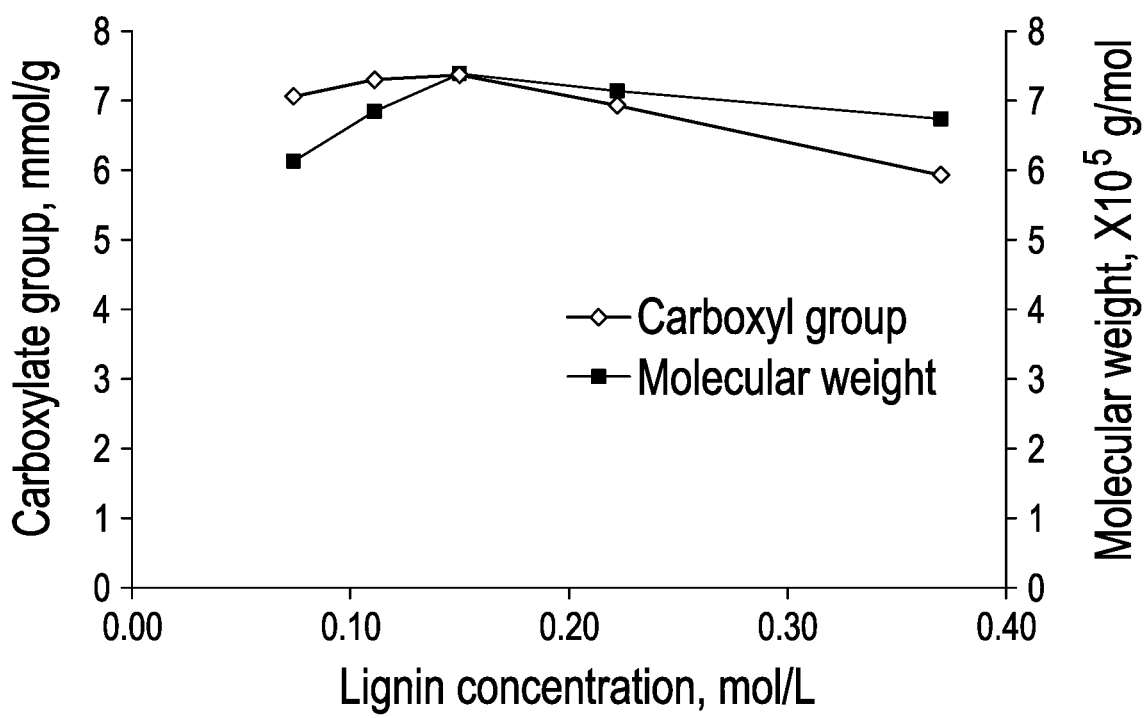
FIG. 10 is a graph of carboxylate group content (mmol/g) and molecular weight of lignin-AA copolymer (g/mol) vs.

The effects of lignin concentration on carboxylate group content and molecular weight of lignin-AA copolymer are shown in FIG. 10. As is observed, with the increase in the lignin concentration, the carboxylate group and molecular weight of lignin-AA copolymer increased to 7.37 mmol/g and $7.4 \times 10^5$ g/mol at 0.15 mol/L lignin concentration. The increase in carboxylate group and molecular weight are attributed to the increased amount of phenolic hydroxyl radicals as well as increased probability of collision among lignin radicals, monomer radicals and the initiator molecules to form lignin-AA copolymer.[47-49] When the lignin concentration is higher than 0.15 mol/L, the phenolic hydroxyl radicals would have a higher probability to interact with other lignin radicals, such as benzyl or phenolic hydroxyl radicals, by disproporationation or radical coupling reactions.[3,41] Thus, the active radicals, which could initiate the copolymerization of monomers, were ineffectively consumed, leading to the reduced molecular weight and carboxylate group content. Alternatively, as a free radical scavenger (lignin),[21] more lignin would result in a higher probability of quenching free radicals.

To investigate the relationship between carboxylate group and molecular weight of lignin-AA copolymer, the data presented in previous figures were plotted in FIG. 11. As shown in FIG. 11, the molecular weight of the copolymer increased linearly with an increase in the carboxylate group content, indicating that an increase in the molecular weight of copolymer is mainly attributed to the PAA segment in the KL-AA copolymer. The relationship between carboxylate group content and molecular weight is $Y=1.0618X-0.9738$, $R^2=0.9462$, where Y is the molecular weight ($\times 10^5$ g/mol) and X is the carboxylate group content of the KL-AA copolymer (mmol/g). This formula can be used to determine the molecular weight of lignin-AA copolymer through its carboxylate group content. In addition to the molecular weight, the Hy of lignin-AA copolymers with different carboxylate group contents for the same samples were measured and presented in FIG. 11. The Hy of lignin-AA copolymers did not show a linear relationship with the carboxylate group content, illustrating that even though lignin-AA with a pre-determined molecular weight can be generated, the formed lignin-AA copolymer may have different molecular conformations (coiled/linear) in solution if they were produced under different conditions. The higher Hy of samples with a lower carboxylate group content may imply that, when the amount of carboxylate groups (and molecular weight) of copolymer is low, the copolymer is linear, but at a high carboxylate group content (and high MW), the copolymer has a coiled conformation.

Based on the results shown in previous figures, the optimal conditions for producing lignin-AA copolymer were 0.15 mol/L KL, AA/KL molar ratio 10.0, initiator 1.5 wt. % (based on lignin mass), 80° C. and 3 h. Under these conditions, the carboxylate group content and molecular weight of KL-AA copolymer reached 7.37 mmol/g and $7.4 \times 10^5$ g/mol, respectively. This lignin-AA copolymer was selected for further analysis.

Characterization of Lignin-AA Copolymer

FT-IR

The FTIR spectra of KL-AA copolymer prepared under optimal conditions and KL are presented in FIG. 12. Both KL and KL-AA copolymer showed a broad band around 3400 $cm^{-1}$, which is assigned to the OH stretching of phenolic and aliphatic compounds, and a band around at 2900 $cm^{-1}$, which is assigned to the C—H stretching in the methyl groups.[50-52] The absorption band at 1700 $cm^{-1}$ in the spectra of KL and KL-AA copolymer is assigned to carbonyl groups conjugated with an aromatic ring.[53] In the spectrum of KL, two absorption bands were observed centering at around 1266 $cm^{-1}$ and 1140 $cm^{-1}$, which are assigned to the C—O stretch of guaiacyl unit and C—H stretch of guaiacyl unit, respectively, illustrating that KL was a softwood lignin.[54] The characteristic bands for the aromatic skeletal vibration of KL were located at around 1591, 1510 and 1425 $cm^{-1}$, respectively.[54] In the spectrum of KL-AA copolymer, two new strong absorption peaks appeared at 1558 $cm^{-1}$ and 1406 $cm^{-1}$, which were absent in the spectrum of KL These two peaks belong to carboxylic acid and symmetrical stretching vibrations of carboxyl anions —COO$^-$, which illustrates the existence of PAA chain segment in the KL-AA copolymer.[55,56] The absorption peaks at 1510 $cm^{-1}$ and 1425 $cm^{-1}$, in the spectrum of KL-AA copolymer were assigned to the aromatic skeletal vibration of KL and demonstrate the presence of aromatic rings in KL,[18] which provided further evidence for successful copolymerization of KL and AA. Interestingly, the results in FIG. 12 also demonstrate that the relative intensity of the band at 1028 $cm^{-1}$, which belongs to non-etherified Ph-OH groups in KL-AA copolymer, was weaker than that in KL, suggesting that lignin participated in the copolymerization reaction through its active phenolic hydroxyl groups.[57]

Elemental Analysis

The elemental analysis of KL and KL-AA copolymer was carried out and the results are tabulated in Table 5. It is clear that the oxygen content of KL-AA copolymer increased from 27.04% in KL to 31.69 wt. % in the copolymer. Moreover, with the increase in the carboxylate group and the molecular weight, the oxygen content increased, while the carbon and hydrogen contents decreased. These changes on the carbon, hydrogen and oxygen contents of lignin in the copolymer (compared to KL) are due to the presence of PAA chains on lignin-AA copolymer. In another report on the copolymerization of amylopectin and AA the hydrogen and oxygen contents of amylopectin were increased from 6.15% and 46.86% to 7.25% and 54.27%, respectively, but its carbon content decreased from 46.99% to 38.48%.[39]

TABLE 5

Elemental and other analyses of lignin-AA copolymer

| Sample | carbon, wt. % | hydrogen, wt. % | oxygen, wt. % | Formula | carboxylate group, mmol/g | Mw, ×10$^5$ g/mol |
| --- | --- | --- | --- | --- | --- | --- |
| KL | 62.6 | 5.69 | 27.04 | $C_9H_{9.60}O_{2.85}$ | 0.37 | 0.17 |
| KL-AA | 45.3 | 3.92 | 31.69 | $C_9H_{9.34}O_{4.72}$ | 7.37 | 7.4 |

$^1$H-NMR Analysis

The NMR spectra of KL and KL-AA copolymer are shown in FIG. 13, respectively. In FIG. 13, the peak at 9.97 ppm is attributed to the protons of the carboxylate groups in KL; the peak at 9.20 ppm is attributed to the hydrogen linked to the aldehyde group; the peak at 8.30 ppm is associated with unsubstituted phenolic protons; the peak at 7.42-5.99 ppm is attributed to aromatic protons (f on FIG. 13); the peak at 5.75-5.15 ppm is attributed to aliphatic protons including $H_\alpha$ and $H_\beta$; the peak at 3.9-2.55 ppm is attributed to protons in methoxyl groups (e on the figure) of lignin; and the peak at 3.20 ppm is assigned to the methylene protons in β-β structure.[58-60] The peaks appearing at 4.5 ppm-4.9 ppm are assigned to the residual $^1H$ in $D_2O$.

In FIG. 13, it can be observed that the peaks for the PAA chain segment appeared at 1.4 ppm, 2.0 ppm and 2.4 ppm, respectively. Peaks appearing at 1.4 ppm are attributed to C-1 (a), at 2.0 ppm is attributed to C-2 (b), and 2.4 ppm is assigned to proton of hydroxyl end groups of PAA(c).[25] The peaks at 3.20 ppm, 2.55-3.0 ppm, 5.15-5.75 ppm, 5.99-7.42 ppm, 8.30 ppm and 9.2 ppm belonging to KL illustrate the successful copolymerization of KL and AA. In addition, the peak at 4.10 ppm is observed in the spectrum of KL-AA copolymer, which is absent in that of KL and assigned to the protons of —$CH_2$— (d in the figure) connected with aromatic structure through ether bond (—$CH_2$—O—$C_6H_5$).[61,62] This also confirms that the Ph-OH groups are the active sites participating in the copolymerization reaction, which is consistent with the FTIR results. The decrease in the peak intensity at 8.30 ppm is assigned to unsubstituted phenolic groups of KL in the KL-AA copolymer and demonstrate a decline in the residual Ph-OH group content of the copolymer, which is consistent with the results discussed in the previous section.

Physical Properties of Lignin-AA Copolymer

Water Solubility

The solubility of KL-AA copolymer and KL are presented as a function of pH in FIG. 14. As can be seen, at pH 10, the solubility of KL drops dramatically to less than 2 g/L. Interestingly, the KL-AA copolymer was soluble under acidic conditions to pH 4, below which the KL-AA copolymer became insoluble. As is well known, the pKa of carboxylic acid is around 4.75, which implies that the solubility of KL-AA copolymer is due to the presence of carboxylate groups at a pH that is higher than 4.0.[63] Also, it was observed that at pH 7, KL had a very low solubility (only 0.2 g/L), however, KL-AA copolymer has a 10 g/L solubility, which illustrated the dramatic increase in the solubility of KL via this copolymerization. Here, it should be noted that the highest concentration of KL-AA copolymer in water (at pH 7) can be as high as 100 g/L.

Impact of pH on Hydrodynamic Diameter

It was reported that the hydrodynamic diameter of a polymer is related to its conformation in solution, which can affect its industrial application such as its flocculation performance.[64,65] For this reason, dynamic light scattering was used to analyze the hydrodynamic diameter (Hy) of the KL-AA copolymer in solutions at different pHs (FIG. 15). At a high pH, the PAA and KL segments of the KL-AA copolymer are completely deprotonated (i.e. charged). Hence, the molecules of KL-AA copolymer are stretched and the copolymer showed a maximum hydrodynamic diameter of 35.2 nm. When the pH decreased, the hydrodynamic diameter decreased. At a low pH, the PAA and the KL segments of the copolymer are most probably in a coiled conformation due to the protonation of carboxylate group and hence a smaller Hy (20.8 nm) was observed. When the pH was increased back to alkaline conditions, an increase in the diameter was observed illustrating that the conformational changes were largely reversible. In this case, the maximum Hy observed was 31 nm. This diameter was slightly lower than the original diameter and can be explained by the increase in salt concentration of the solution as the pH changes. By decreasing and increasing pH, some salts are formed in the KL-AA copolymer solution, and this additional salt screens the charges on the KL-AA copolymer leading to its smaller size. It should be noted that KL had a Hy of 6.1 nm at pH 10.5, which is much lower than that of KL-AA copolymer (35.2 nm).

Rheological Behavior

To understand the viscosity behavior of KL-AA copolymers, the dynamic viscosities of KL-AA copolymers prepared under optimal conditions were measured at different concentrations and pHs as shown in FIG. 16. The viscosity of KL-AA copolymer solution at 50 g/L at pH 12 was 318 cPa (not shown in FIG. 16), which is much higher than that of KL solution (3.06 cPa) under the same conditions. The higher viscosity of KL-AA copolymer is due to the large Hy of KL-AA copolymer (FIG. 15). As can be seen, at the same concentration, the viscosity of KL-AA copolymer solution was higher at a higher pH and this behavior is due to the stretched conformation of KL-AA copolymer (FIG. 15). Furthermore, the viscosity difference was more pronounced when the pH was increased from 4 to 6, which illustrates that the deprotonation and thus reconformation of the KL-AA copolymer played a major role in the viscosity of KL-AA copolymer.

To study the rheological behavior of KL-AA copolymer, the viscosities of this copolymer at different shear rates were measured at pH 8 and 10 and are shown in FIG. 17. The results show that the viscosity decreased with increasing shear rate. This clearly shows that the solution of KL-AA copolymer has a pseudoplastic (shear thinning) behavior, and this is consistent with the fact that KL and PAA both have separately pseudoplastic behavior in water.[66,67] One can conclude that, by the copolymerization of KL and AA, a copolymer with shear stable and thickening properties can be produced. These properties are important for the application of this copolymer as a flocculant.

Effect of Lignin Pretreatments on Lignin-PAA

In this set of experiments, 10 different types of lignin were used to generate lignin-PAA. The lignins used were from two different kraft mills located in Canada, Mills X and Y. The lignin was either softwood (SW) or hardwood (HW), acid-washed (Lignin A or LRC lignin) or unwashed (Lignin B or HRC lignin). Lignin A and Lignin B were used wet (W) at a 44% and 35% moisture content, respectively, or dried (D) at room temperature for 48 hrs. The reaction conditions used to generate the lignin-PAA copolymers were the optimized conditions discussed above: 0.15 mol/L KL, AA/KL ratio of 10.0 mol/mol, 1.5 wt. % initiator, 80° C. and 3 h.

The overall mass balance for the production of lignin-PAA from the 10 different lignin samples can be found in Table 6. The 10 different types of lignin can be split into 4 different categories, hardwood vs. softwood, wet (W) vs. dry (D), Mill X vs. Mill Y and Lignin A vs. Lignin B. Of the 4 different categories, there was little variation between hardwood vs. softwood, wet vs. dry and between lignin extracted from the two different Canadian mills Mill X and Y. Varying these three factors had little effect on charge density, molecular weight, residual AA, PAA and lignin-AA yield. However, examining Lignin A vs. Lignin B used in the production of the lignin-PAA copolymer, an effect on charge density and molecular weight was observed, however, the amount of unreacted AA (after polymerization) and lignin-PAA yield were not significantly affected.

The effect of Lignin B vs. Lignin A on charge density can be seen in FIG. 18A When Lignin B was used to generate lignin-AA, an average charge density of 6.68 meq/g was achieved which was slightly higher than that obtained when Lignin A was used (charge density of 6.43 meq/g). The higher charge density of lignin-AA for Lignin B is due to an increase in the molecular weight of polymers that are generated during the reaction. The molecular weights of lignin-AA for both Lignin A and Lignin B are shown in FIG. 18B. It can be observed in this Figure that when Lignin A was used, an average $M_w$ of $6.1 \times 10^5$ g/mol was obtained, while when Lignin B was used a copolymer with a Mw of. $6.4 \times 10^5$ g/mol was produced.

The effect on the yield of both PAA and lignin-AA when either Lignin A or Lignin B were used can be found in FIGS. 19A and B, respectively. When Lignin A was used to produce lignin-AA, the average yield for PAA generation was 23% vs. 24% when Lignin B was used. In addition, there was not a significant difference in lignin-AA yield when either Lignin A or Lignin B was used (FIG. 19B). When Lignin A was used, it resulted in a lignin-AA yield of 69% vs. 70% when Lignin B was used.

The lignin amount present in lignin-PAA and mass balance of the lignin copolymer can be found in FIGS. 20 A and B. When Lignin A was used, the amount of lignin in lignin-PAA was on average 44% and when lignin B was used, it was 46%. There was only a slight difference between Lignin A and Lignin B with Lignin B having a slightly higher lignin content in the resulting copolymer. The amount of copolymer, homopolymer and residual monomer remaining after the copolymerization was consistent across the different lignins and independent of the origin of lignin. The only significant difference was the average charge density and $M_w$ of lignin-PAA when Lignin B was used as compared to Lignin A. The higher charge density and $M_w$ of the Lignin B-based copolymer could be attributed to the higher concentration of free phenolic groups present in Lignin B allowing for an increased number of polymerization sites on lignin.

Process for Lignin-AA Production

The skilled person in the art would understand that a variety of lignins could be copolymerized with acrylic acid (AA) to produce lignin-AA copolymers with the required features with respect to MW and charge density to be used as a flocculant in a variety of industrial applications. Such lignins include but are not limited to: softwood kraft and soda lignins, hardwood kraft and soda lignins, lignins from the pulping of non-woods, hydrolysis lignins of various types and lignins from organosolv processes. Such lignins also include depolymerized versions of such lignins.

With reference to FIG. 21A, in one embodiment a lignin-AA co-polymer production system comprises a co-polymerization reactor 1, an ultrafiltration and/or nanofiltration system 2, a kraft mill recovery cycle, 3 and, optionally, a lignin plant 4. Lignin from an outside source and/or lignin from an on-site lignin plant is directed via flow lines 1a and 3b to the co-polymerization reactor 1.

Water, an acid, a free radical initiator and monomer compound bearing a negative charge are added to the co-polymerization reactor 1, along flow lines 1b, 1c, and 1d, respectively. The acid 1b is in a preferred embodiment sulphuric acid. The free radical initiator 1c, is in a preferred embodiment sodium persulphate. The monomer compound 1d is in a preferred embodiment acrylic acid (AA). The polymerization reaction with the lignin 1a is allowed to go to completion. Once the co-polymerization reaction is completed, the reaction products are directed via flow line 1e to the ultrafiltration and/or nanofiiltration system 2. The concentrate from the ultrafiltration and/or nanofiltration system, 2, is removed via flow line 2e—this represents one of the main aspects described herein in a concentrated and purified form.

TABLE 6

Mass balance of lignin-PAA

| Mill | Sample | unreacted AA, g | unreacted AA to total AA used, (%) | PAA, g | PAA produced to total AA used (%) | AA + PAA, g | unreacted AA + PAA to total AA used (%) | unreacted AA + PAA to total mass(AA + lignin), (%) |
|---|---|---|---|---|---|---|---|---|
| Y | HW-LigninB-W | 0.32 | 5.33 | 1.52 | 25.33 | 1.84 | 30.7 | 23.0 |
| X | SW-LigninB-W | 0.32 | 5.33 | 1.48 | 24.67 | 1.8 | 30.0 | 22.5 |
| Y | SW-LigninB-W | 0.21 | 3.50 | 1.547 | 25.78 | 1.757 | 29.3 | 22.0 |
| X | SW-LigninB-D | 0.367 | 6.12 | 1.388 | 23.13 | 1.755 | 29.3 | 21.9 |
| Y | SW-LigninB-D | 0.579 | 9.65 | 1.219 | 20.32 | 1.798 | 30.0 | 22.5 |
| Y | HW-LigninA-D | 0.89 | 14.83 | 1.065 | 17.75 | 1.955 | 32.6 | 24.4 |
| X | SW-LigninA-W | 0.669 | 11.15 | 1.349 | 22.48 | 2.018 | 33.6 | 25.2 |
| Y | SW-LigninA-W | 0.43 | 7.17 | 1.698 | 28.30 | 2.128 | 35.5 | 26.6 |
| X | SW-LigninA-D | 0.854 | 14.23 | 1.28 | 21.33 | 2.134 | 35.6 | 26.7 |
| Y | SW-LigninA-D | 0.61 | 10.17 | 1.427 | 23.78 | 2.037 | 34.0 | 25.5 |

| Mill | mass in supernatant, (AA + PAA + salt + copolymer) (g) | yield of lignin-AA copolymer, % | charge density, meq/g | Mw, *10^5 g/mol | Mn, *10^5 g/mol | Mw/Mn | carboxylate group, meq/g | lignin portion in final copolymer, % |
|---|---|---|---|---|---|---|---|---|
| Y | 5.03 | 67.3 | 6.67 | 6.14 | 3.76 | 1.63 | 5.91 | 44.45 |
| X | 4.91 | 68.05 | 6.68 | 6.45 | 3.34 | 1.93 | 5.83 | 45.20 |
| Y | 4.52 | 72.96 | 6.68 | 6.24 | 3.19 | 1.96 | 6.09 | 42.75 |
| X | 4.62 | 71.61 | 6.54 | 6.37 | 3.12 | 2.04 | 5.76 | 45.86 |
| Y | 4.65 | 71.01 | 6.86 | 6.67 | 3.14 | 2.12 | 6.17 | 42.00 |
| Y | 4.7 | 70.58 | 6.55 | 6.07 | 3.89 | 1.56 | 5.99 | 43.69 |
| X | 4.94 | 66.52 | 6.48 | 6.26 | 3.25 | 1.93 | 5.94 | 44.16 |
| Y | 4.72 | 68.83 | 6.14 | 5.86 | 3.02 | 1.94 | 5.52 | 48.11 |
| X | 4.78 | 68.5 | 6.32 | 5.98 | 3.03 | 1.97 | 5.67 | 46.70 |
| Y | 4.65 | 70.03 | 6.66 | 6.3 | 2.67 | 2.36 | 5.82 | 45.29 |

The permeate from the ultrafiltration and/or nanofiltration system, 2 is removed via flow line 2b. To the extent possible, the permeate is recycled to the co-polymerization reactor, 1 via flow line 2c while the rest is returned to the kraft recovery cycle, 3 via flowline 2d. In mills that already have a lignin plant, 30-40% solids black liquor from the kraft recovery cycle, 3 is directed to the lignin plant, 4 for the production of lignin. The latter is directed to the co-polymerization reactor 1 via flow line 3b.

Alternatively, with reference to FIG. 21B, once the co-polymerization reaction is completed, the reaction products can be directed via flow line 1e to a precipitation/filtration step 2, during which sulphuric acid is added to the reaction products to lower the pH to below 2. At this pH, the lignin-AA copolymer precipitates out while the unreacted chemicals and by-products of the reaction (e.g. PAA homopolymer) remain in solution. Hence, the lignin-AA copolymer can be separated out using filtration, centrifugation or decantation and removed in a concentrated and purified form via flow line 2e—this represents one of the main aspects described herein in a concentrated and purified form.

The filtrate from the precipitation/filtration step (or the supernatant from a centrifugation or decantation step) 2 is removed via flow line 2b. To the extent possible, the filtrate is recycled to the co-polymerization reactor, 1 via flow line 2c while the rest is returned to the kraft recovery cycle, 3 via flowline 2d. In mills that already have a lignin plant, 30-40% solids black liquor from the kraft recovery cycle, 3 is directed to the lignin plant, 4 for the production of lignin. The latter is directed to the co-polymerization reactor 1 via flow line 3b.

Lignin-AA copolymers in various forms can be made using the processes of this invention. Purchased lignin or lignin produced on-site using any one of the commercially available processes (e.g. Westvaco™, LignoBoost™, LignoForce™ or Liquid Lignin™) can be fed to a copolymerization reactor (e.g. a CSTR type of reactor) along with water (the reaction medium), sulphuric acid (acidifying agent), AA monomer and sodium persulphate (free radical initiator). The lignin used could be in either the acid-washed form (LRC lignin) or, preferably, in the unwashed (HRT lignin) form. The reaction can be conducted at a pH of about 3 to 4 under the optimal conditions described above for the production of lignin-AA copolymer with the desired charge densities and MWs. The final product of this reaction typically has a concentration of about 20 wt. % solids. This product can be used as is (especially in the case of kraft pulp mill specific applications), or concentrated and purified using ultrafiltration/nanofiltration and/or precipitation/filtration to about 30-40 wt. % solids. This product can, in turn, be spray-dried to produce a dry product. The residual chemicals from the processes of this invention can, to a certain extent, be returned to the copolymerization reactor since they contain mostly unreacted residual chemicals such as AA, sulphuric acid, sodium sulphate and sodium persulphate. The balance can be sent to the mill recovery cycle (black liquor flow) and, ultimately, burned in the mill recovery boiler. Since this stream contains organics (e.g. carbon and oxygen-based organics) and inorganics (e.g. sodium sulphate) that are fully compatible with the kraft recovery cycle, no operational problems are anticipated in any of the unit operations of the recovery cycle (e.g. evaporators, recovery boiler, causticizing system or lime kiln). Alternatively, if the Biochemical Oxygen Demand (BOD) and Chemical Oxygen Demand (COD) contents of this stream are limited, it can be directed to the mill wastewater system for processing.

For the purposes of this invention, anionic lignin copolymers were synthesized by the copolymerization of kraft lignin with an anionic monomer using potassium persulfate as a free radical initiator. Alternatively, sodium persulphate ($Na_2S_2O_8$) can be used to initiate the copolymerization, which is more compatible with the kraft recovery cycle of kraft pulp mills in which sodium and sulphur are the main process elements. However, it should be understood by those skilled in the art, that free radical polymerization can be induced using other approaches as well such as UV light, microwaves or enzymes, these conditions are defined herein and understood as a free radical generating condition, where a preferred embodiment is an aqueous acidic free radical generating condition (pH<6, preferably between 3 and 4 pH, and most preferably 3.5 pH). An acidic free radical generating condition is one that includes an aqueous solution with an acid and at least one of a free radical initiator, a UV light, and/or microwaves.

Applications

Flocculation Performance of KL-AA Copolymer for Alumina Suspension

Alumina is an industrially important oxide mineral. The flocculation of alumina particles is a key step for the treatment of wastewater in the mining industry.[68] The flocculation characteristics of KL-AA copolymer at different pHs were measured in a 2.5 wt. % alumina suspension, and the results are presented in FIG. 22. With an increase in the concentration, the flocculation efficiency of KL-AA was enhanced, but better results were obtained for KL-AA copolymer at pH 6. Compared with the PAA prepared under the same conditions, the KL-AA copolymer demonstrated a higher flocculation performance at pH 6, as shown in FIG. 22. As reported in the literature, flocculation can be promoted via charge neutralization, bridging, and hydrophobic/hydrophobic interactions.[69,70] The reasons for the better flocculation efficiency of KL-AA copolymer at pH 6 are due to the fact that 1) the KL-AA copolymer has a more stretched molecular conformation at pH 6 than at pH 4 (higher $h_y$ according to FIG. 15), and thus a higher bridging efficiency, and 2) the surface charge of alumina particles is positive at pH 6 (zeta potential, 12.4 mV), which can be neutralized by the negative charge of KL-AA copolymer and 3) the KL segment of the KL-AA copolymer offers the hydrophobic/hydrophobic interaction with alumina.[69] FIG. 22 also shows that flocculation happened at pH 8 among alumina particles although at this pH the surface charge of alumina particles is negative (zeta potential, −5.48 mV). As both copolymer and particles had negative charge densities, there was no electrostatic charge interaction between the copolymer and the particles at this pH. However, the copolymer had a higher Hy at pH 8 than pHs 4 and 6 suggesting that bridging played the main role in this case. Furthermore, compared to PAA, the copolymer performed better at a dosage higher than 4 mg/L, which is due to the higher molecular weight of KL-AA ($7.4 \times 10^5$ g/mol) and higher Hy (25.2 nm) than those of PAA ($4.26 \times 10^5$ g/mol and 7.2 nm). The results suggest that KL-AA can be a more efficient flocculant than PAA and its efficiency was the highest at pH 6 for alumina.

Impact of Lignin-AA Purity

To investigate how the purity of lignin-AA copolymer impacts its flocculation performance, in one set of experiments, lignin-AA was precipitated from the reaction medium by dropping the pH below 2, while in another set of experiments, the products of the lignin-AA copolymerization reaction were used without purification (i.e. directly from the reactor medium). The results of this evaluation are shown in FIG. 23. The results showed that a dosage of 50 ppm of unpurified lignin-AA was required to flocculate the alumina suspension (to a relative turbidity of 0.2) vs. a dosage of 100 ppm was required for the purified lignin-AA (to a relative turbidity of 0.28). This increase in flocculation efficiency using the unpurified lignin-AA was due to the presence of PAA and AA in addition to the copolymer in the reaction medium (as listed in Table 6), which aid in flocculating the alumina that are not present in the purified lignin sample.

In summary, the copolymerization mechanism of KL and AA under acidic conditions was comprehensively studied in this work. The results suggest that the phenolic hydroxyl group content of KL had a significant influence on copolymerization with AA The optimal conditions for the copolymerization were 0.15 mol/L KL, AA/KL ratio of 10.0 mol/mol, 1.5 wt. % initiator, 80° C. and 3 h. Under the optimized conditions, the carboxylate group content and the molecular weight of the KL-AA copolymer were 7.22 meq/g and $7.4 \times 10^5$ g/mol, respectively. The FTIR, $^1$H-NMR and elemental analyses confirmed the successful copolymerization of KL and AA Additionally, the resulting KL-AA copolymer was water soluble at a pH higher than 4.5, and also its solution shows a pseudoplastic behavior. The dynamic light scattering analysis confirmed that the KL-AA copolymer displayed a pH-responsive behavior in solution. In the pH range of 6-11, the acrylic acid segments of KL-AA copolymer are fully charged, adopting a more stretched conformation, and larger diameters (~35 nm). When the pH was low, the PAA chains adopted a more coiled conformation, and the diameters of the copolymer decreased to ~21 nm at pH 4.5. Compared with PAA, the KL-AA copolymer was a more efficient flocculant for alumina suspensions at pH 6.

In addition, a mass balance was developed for 10 different types of lignin and the results confirmed that LigninB produced lignin-AA with the highest charge density and molecular weight. A new process to produce lignin-AA was developed, which can be used as a standalone reactor or integrated with lignin-production processes (e.g. LignoForce® system). Furthermore, unpurified lignin-AA was more effective than purified copolymer in flocculating alumina particles, which implies that purification of the reaction medium may not be necessary in certain cases.

Example 7

In this set of experiments, we demonstrated the technical feasibility of producing anionic kraft lignin-based polymers via co-polymerization of methylmethacrylate with kraft lignin. Table 7 lists the experimental conditions used and the properties (i.e., Mw and Charge density) of the products of these reactions. After the reactions, the product was acidified and precipitated materials were collected. Then, the anionic lignin-based polymers were separated from homopolymer using Soxhlet extraction with methanol for MMA-g-KL1 or with acetone for MMA-g-KL2. As seen in Table 7, the reactions under the two different conditions generated products with different molecular weights and anionic charge densities. The products were soluble at 10 g/L concentration in water.

TABLE 7

Reaction conditions for the production of kraft lignin-based methylmethacrylate polymers and properties of such polymers

| Product | $K_2S_2O_8$, g | pH | Water, mL | Time, h | Temperature, ° C. | Lignin, g | Mw, g/mol | Charge density, meq/g |
|---|---|---|---|---|---|---|---|---|
| MMA-g-KL1 | 0.03 g | 5-6 | 90 | 1.05 | 45 | 0.5 | 117800 | 1.06 |
| MMA-g-KL2 | 0.03 g | 5-6 | 50 | 1.5 | 60 | 1 | 43680 | 1.9 |

REFERENCES (1) Zhang, X.; Tu, M. B.; Paice, M. G. *Bioenerg Res* 2011, 4, 246.
(2) Stewart, D. *Ind. Cro. Prod.* 2008, 27, 202.
(3) Ye, D. Z.; Jiang, L.; Ma, C.; Zhang, M. H.; Zhang, X. *Int. J. Biol. Macromol.* 2014, 63, 43.
(4) Fatehi, P. *Curr. Org. Chem.* 2013, 17, 1569.
(5) Amen-Chen, C.; Pakdel, H.; Roy, C. *Bioresour. Technol.* 2001, 79, 277.
(6) Wei, X.; Liu, X.; Yu, Q.; Jiang, F. *Oil Field Chemistry* 2002, 19, 15.
(7) Chen, M. J.; Gunnells, D. W.; Gardner, D. J.; Milstein, O.; Gersonde, R.; Feine, H. J.; Huttermann, A.; Frund, R.; Ludemann, H. D.; Meister, J. J. *Macromolecules* 1996, 29, 1389.
(8) Ye, D. Z.; Jiang, X. C.; Xia, C.; Liu, L.; Zhang, X. *Carbohydr. Polym.* 2012, 89, 876.
(9) Chen, R.; Kokta, B. V. *ACS Symp. Ser* 1982, 187, 285.
(10) Chen, R.; Kokta, B. V.; Valade, J. L. *J. Appl. Polym. Sci.* 1980, 25, 2211.
(11) Porto, P. P.; Saliba, E. O. S.; Goncalves, L C.; Rodriguez, N. M.; Borges, I.; Borges, A. L. C. C.; Rodrigues, J. A S.; Ibrahim, G. H. F. *Arq. Bras. Med. Vet. Zootec.* 2006, 58, 99.
(12) Mai, C.; Majcherczyk, A.; Huttermann, A. *Enzyme Microb. Technol.* 2000, 27, 167.
(13) Meister, J. J.; Patil, D. R.; Channell, H. *J. Appl. Polym. Sci.* 1984, 29, 3457.
(14) Meister, J. J.; Patil, D. R.; Channell, H. *Abstracts Of Papers Of the American Chemical Society* 1984, 187, 111.
(15) Ibrahim, M. N. M.; Lim, S. L.; Ahmed-Haras, M. R.; Fayyadh, F. S. *Bioresources* 2014, 9, 1472.
(16) Fang, R.; Cheng, X.-S.; Fu, J.; Zheng, Z-B. *Nat. Sci* 2009, 1, 17.
(17) Phillips, R.; Brown, W.; Stannett, V. *J. Appl. Polym. Sci.* 1971, 15, 2929.
(18) Ye, D. Z.; Jiang, X. C.; Xia, C.; Liu, L.; Zhang, X. *Carbohydr. Polym.* 2012, 89, 876.
(19) Chen, R.; Kokta, B. V.; Valade, J. L. *J. Appl. Polym. Sci.* 1979, 24, 1609.
(20) Kouisni, L.; Holt-Hindle, P.; Maki, K.; Paleologou, M. *Journal of Science & Technology for Forest Products and Processes* 2012, 2, 6.
(21) Kong, F.; Wang, S.; Price, J. T.; Konduri, M. K.; Fatehi, P. *Green Chem.* 2015, DOI: 10.1039/C5GC00228A.

(22) Andes, M. V. *La Chimica E l' Industria* 2006, 88, 88.
(23) Sadeghifar, H.; Cui, C. Z.; Argyropoulos, D. S. *Ind. Eng. Chem. Res.* 2012, 51, 16713.
(24) Schuerch, C. *J. Am. Chem. Soc.* 1952, 74, 5061.
(25) Witono, J. R.; Marsman, J. H.; Noordergraaf, I. W; Heeres, H. J.; Janssen, L. P. *Carbohydr. Res.* 2013, 370, 38.
(26) Zhou, M.; Huang, K.; Qiu, X.; Yang, D. *CIESC J* 2012, 63, 258.
(27) Yan, M. F.; Yang, D. J.; Deng, Y. H.; Chen, P.; Zhou, H. F.; Qiu, X. Q. *Colloid. Surface. A.* 2010, 371, 50.
(28) Jahan, M. S.; Chowdhury, D. N.; Islam, M. K.; Moeiz, S. I. *Bioresour. Technol.* 2007, 98, 465.
(29) Lappan, R. E.; Pelton, R.; McLennan, I.; Patry, J.; Hrymak, A. N. *Ind. Eng. Chem. Res.* 1997, 36, 1171.
(30) Ovenden, C.; Xiao, H. N. *Colloid. Surface. A.* 2002, 197, 225.
(31) Xiao, H.; Liu, Z.; Wiseman, N. *J. Colloid Interface Sci.* 1999, 216, 409.
(32) Blanksby, S. J.; Ellison, G. B. *Acc. Chem. Res.* 2003, 36, 255.
(33) Lanzalunga, O.; Bietti, M. *J. Photochem. Photobiol. B: Biol.* 2000, 56, 85.
(34) Ludwig, C. H.; Sarkanen, K. *Lignins: occurrence, formation, structure and reactions*; Wiley-Interscience, 1971.
(35) Çatalgil-Giz, H.; Giz, A.; Alb, A. M.; Reed, W. F. *J. Appl. Polym. Sci.* 2004, 91, 1352.
(36) Kislenko, V.; Berlin, A. A. *Eur. Polym. J.* 1996, 32, 1023.
(37) Agnemo, R.; Gellerstedt, G. *Acta Chem. Scand.* B 1979, 33, 337.
(38) Ye, D. Z.; Zhang, M. H.; Gan, L. L.; Li, Q. L; Zhang, X. *Int. J. Biol. Macromol.* 2013, 60, 77.
(39) Sarkar, A. K.; Mandre, N.; Panda, A.; Pal, S. *Carbohydr. Polym.* 2013, 95, 753.
(40) Nayak, B. R.; Singh, R. P. *Polym. Int.* 2001, 50, 875.
(41) Chen, R. L; Kokta, B. V.; Daneault, C.; Valade, J. L *J. Appl. Polym. Sci.* 1986, 32, 4815.
(42) Khalil, M. I.; Mostafa, K. M.; Hebeish, A. *Angew. Makromol. Chem.* 1993, 213, 43.
(43) Witono, J. R.; Noordergraaf, I. W.; Heeres, H. J.; Janssen, L. P. B. M. *Carbohydr. Polym.* 2012, 90, 1522.
(44) Bayazeed, A.; Elzairy, M. R.; Hebeish, A. *Starch-Starke* 1989, 41, 233.
(45) Petridis, L.; Schulz, R.; Smith, J. C. *J. Am. Chem. Soc.* 2011, 133, 20277.
(46) Huttermann, A.; Majcherczyk, A.; Braun-Lullemann, A.; Mai, C.; Fastenrath, M.; Kharazipour, A.; Huttermann, J.; Huttermann, A. H. *Naturwissenschaften* 2000, 87, 539.
(47) Kiatkamjornwong, S.; Chomsaksakul, W; Sonsuk, M. *Radiat. Phys. Chem.* 2000, 59, 413.
(48) Fu, Z. S.; Liang, W D.; Yang, A. M.; Wang, Z. G. *J. Appl. Polym. Sci.* 2002, 85, 896.
(49) Thakur, V. K.; Singha, A. S.; Thakur, M. K. *J. Polym. Environ.* 2012, 20, 164.
(50) Ayed, L.; Khelifi, E.; Ben Jannet, H.; Miladi, H.; Cheref, A.; Achour, S.; Bakhrouf, A. *Chem. Eng. J.* 2010, 165, 200.
(51) Ibrahim, M. N. M.; Ahmed-Haras, M. R.; Sipaut, C. S.; Aboul-Enein, H. Y.; Mohamed, A. A. *Carbohydr. Polym.* 2010, 80, 1102.
(52) Pandey, K. K. *J. Appl. Polym. Sci.* 1999, 71, 1969.
(53) Casas, A.; Alonso, M. V.; Oliet, M.; Rojo, E.; Rodriguez, F. *J. Chem. Technol. Biotechnol.* 2012, 87, 472.
(54) El Mansouri, N. E.; Salvado, J. *Ind. Cro. Prod.* 2006, 24, 8.
(55) Wang, J. L.; Zheng, Y. A.; Wang, A. Q. *Advanced Materials Research* 2010, 96, 227.
(56) Mccluskey, P. H.; Snyder, R. L; Condrate, R. A. *J. Solid State Chem.* 1989, 83, 332.
(57) Wang, J. L; Zheng, Y. A.; Wang, A. Q. *Advance In Ecological Environment Functional Materials And Ion Industry* 2010, 96, 227.
(58) Lundquist, K. *Acta Chem. Scand.* B 1981, 35, 497.
(59) Nagy, M.; Kosa, M.; Theliander, H.; Ragauskas, A. *J. Green Chem.* 2010, 12, 31.
(60) Hu, L H.; Pan, H.; Zhou, Y. H.; Hse, C. Y.; Liu, C. G.; Zhang, B. F.; Xu, B. *J. Wood Chem. Technol.* 2014, 34, 122.
(61) Kang, Y. C.; Chen, Z. Z.; Wang, B. J.; Yang, Y. Q. *Ind. Cro. Prod.* 2014, 56, 105.
(62) Xiong, X. Y.; Tam, K. C.; Gan, L. H. *Macromolecules* 2003, 36, 9979.
(63) Nikouei, N. S.; Lavasanifar, A. *Acta Biomater.* 2011, 7, 3708.
(64) Besra, L.; Sengupta, D.; Roy, S.; Ay, P. *Sep. Purif. Technol.* 2004, 37, 231.
(65) Zhou, Y.; Franks, G. V. *Langmuir* 2006, 22, 6775.
(66) Tamburic, S.; Craig, D. Q. M. *J. Controlled Release* 1995, 37, 59.
(67) Barzegari, M. R.; Alemdar, A.; Zhang, Y. L.; Rodrigue, D. *Polym. Compos.* 2012, 33, 353.
(68) Feng, D.; Van Deventer, J.; Aldrich, C. *Sep. Purif Technol.* 2004, 40, 61.
(69) Healy, T. W.; La Mer, V. K. *J. Colloid Sci.* 1964, 19, 323.
(70) Ghosh, S.; Sen, G.; Jha, U.; Pal, S. *Bioresour. Technol.* 2010, 101, 9638.

The invention claimed is:

1. A method for preparing an anionic lignin copolymer comprising:
   providing water;
   providing a kraft lignin;
   providing at least one anionic monomer;
   mixing the water, the lignin, and the at least one monomer compound under acidic free radical generating conditions to polymerize the lignin and at least one monomer compound in aqueous suspension and to produce the anionic lignin copolymer.

2. The method of claim 1, wherein the anionic monomer is a vinyl monomer.

3. The method of claim 2, wherein the vinyl monomer is selected from the group consisting of:
   acrylic acid, acrylonitrile and methyl methacrylate and combinations thereof.

4. The method of claim 2, wherein the anionic monomer is acrylic acid.

5. The method of claim 1, wherein the acidic free radical generating conditions are in aqueous solution with an acid and at least one of a free radical initiator, a UV light, and microwaves.

6. The method of claim 5, wherein the free radical initiator is sodium persulphate or potassium persulphate.

7. The method of claim 1, wherein the pH of the acidic free radical generation conditions is from 2 to 7.

8. The method of claim 7, wherein the pH is 3 to 4.

9. The method of claim 1, wherein the lignin is an acid washed low residual content lignin or an unwashed high residual content lignin.

10. The method of claim 9, wherein the lignin is the unwashed high residual content lignin.

11. An anionic kraft lignin copolymer comprising:
a molecular weight of 90,000 to $7.4 \times 10^5$ g/mol;
a carboxylate group content of 2 to 7 mmol/g and
a charge density of −1.0 to −7.2 meq/g.

12. The anionic lignin copolymer of claim 11, wherein an anionic monomer is used to prepare said anionic lignin copolymer, said anionic monomer is acrylic acid.

13. A method of flocculating positively charged particles or molecules in a wastewater or process stream by adding the anionic lignin copolymer of claim 11.

14. The method of claim 13, wherein the wastewater is industrial wastewater and/or municipal wastewater.

15. The method of claim 14, wherein the industrial wastewater or process stream is from the textile dye, pulp and paper, mining or oil industries.

16. The method of claim 15, wherein the anionic lignin copolymer is used to dewater sludge from the industrial wastewater or process stream.

17. A method of dispersing negatively charged particles or molecules in a wastewater or process stream by adding the anionic lignin copolymer defined in claim 11.

* * * * *